(12) United States Patent
Lapstun

(10) Patent No.: US 8,328,109 B2
(45) Date of Patent: Dec. 11, 2012

(54) CODING PATTERN COMPRISING REGISTRATION SYMBOLS FOR IDENTIFYING THE CODING PATTERN

(75) Inventor: Paul Lapstun, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 553 days.

(21) Appl. No.: 12/539,579

(22) Filed: Aug. 11, 2009

(65) Prior Publication Data
US 2010/0084477 A1 Apr. 8, 2010

Related U.S. Application Data

(60) Provisional application No. 61/102,299, filed on Oct. 2, 2008.

(51) Int. Cl.
*G06K 19/06* (2006.01)
(52) U.S. Cl. .................. 235/494; 235/462.08; 235/487; 235/456
(58) Field of Classification Search .................. 713/157; 235/494, 456, 487, 454, 462.08
See application file for complete search history.

(56) References Cited

U.S. PATENT DOCUMENTS

| | | | |
|---|---|---|---|
| 4,864,618 A | 9/1989 | Wright et al. | |
| 4,924,078 A | 5/1990 | Sant'Anselmo et al. | |
| 5,051,736 A | 9/1991 | Bennett et al. | |
| 5,477,012 A | 12/1995 | Sekendur | |
| 5,612,524 A | 3/1997 | Sant Anselmo et al. | |
| 5,652,412 A | 7/1997 | Lazzouni et al. | |
| 5,661,506 A | 8/1997 | Lazzouni et al. | |
| 5,692,073 A | 11/1997 | Cass | |
| 5,852,434 A | 12/1998 | Sekendur | |
| 6,076,734 A | 6/2000 | Dougherty et al. | |
| 6,267,296 B1 | 7/2001 | Ooshima et al. | |
| 6,964,374 B1 | 11/2005 | Djuknic et al. | |
| 7,510,125 B2 | 3/2009 | Look | |
| 7,980,480 B2 | 7/2011 | Lapstun | |
| 7,992,793 B2 | 8/2011 | Lapstun | |
| 8,006,911 B2 | 8/2011 | Yi et al. | |

(Continued)

FOREIGN PATENT DOCUMENTS

| GB | 2306669 A | 5/1997 |
|---|---|---|
| WO | WO 99/18487 A2 | 4/1999 |
| WO | WO 99/50787 A1 | 10/1999 |
| WO | WO 2009/036486 A1 | 3/2009 |

OTHER PUBLICATIONS

Dymetman, M., and Copperman, M., "Intelligent Paper in Electronic Publishing, Artist Imaging, and Digital Typography. Proceedings of EP '98", Mar./Apr. 1996, Springer Verlag LNCS 1375, pp. 392-406.

*Primary Examiner* — Thien M Le
*Assistant Examiner* — Sonji Johnson

(57) ABSTRACT

A substrate having a first coding pattern disposed on a surface thereof. The first coding pattern comprises: a plurality of target elements defining a target grid, the target grid comprising a plurality of cells, wherein neighboring cells share target elements; a plurality of data elements contained in each cell; and a plurality of tags. Each tag is defined by a first set of contiguous cells. Each tag comprises respective tag data encoded by a respective set of the data elements. Each cell comprises one or more registration symbols encoded by a respective set of said data elements. Each of the registration symbols identifies the cell as being contained in the first set, and thereby contained in the first coding pattern.

16 Claims, 26 Drawing Sheets

U.S. PATENT DOCUMENTS

| | | |
|---|---|---|
| 8,006,912 B2 | 8/2011 | Lapstun et al. |
| 2004/0011872 A1 | 1/2004 | Shimizu |
| 2004/0173687 A1 | 9/2004 | Lapstun |
| 2004/0182930 A1 | 9/2004 | Nojiri |
| 2005/0173533 A1 | 8/2005 | Pettersson |
| 2005/0273597 A1* | 12/2005 | Lapstun et al. ............... 713/157 |
| 2008/0035730 A1 | 2/2008 | Look |
| 2009/0121031 A1 | 5/2009 | Hall et al. |

* cited by examiner

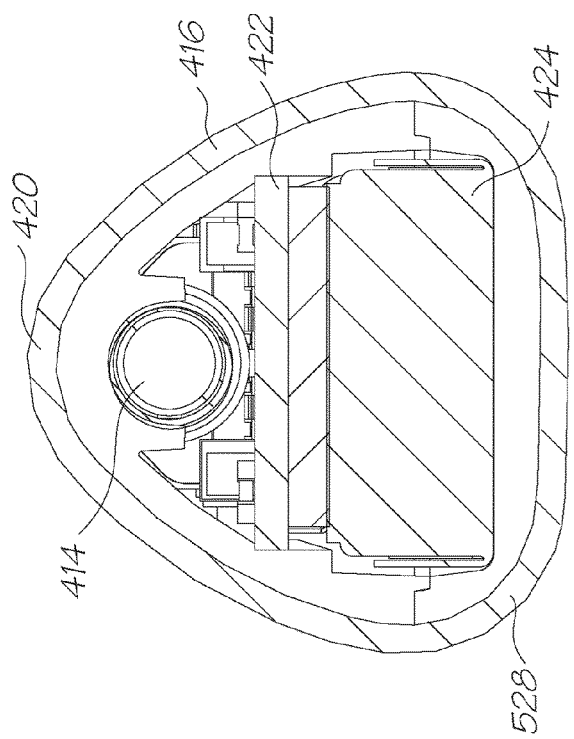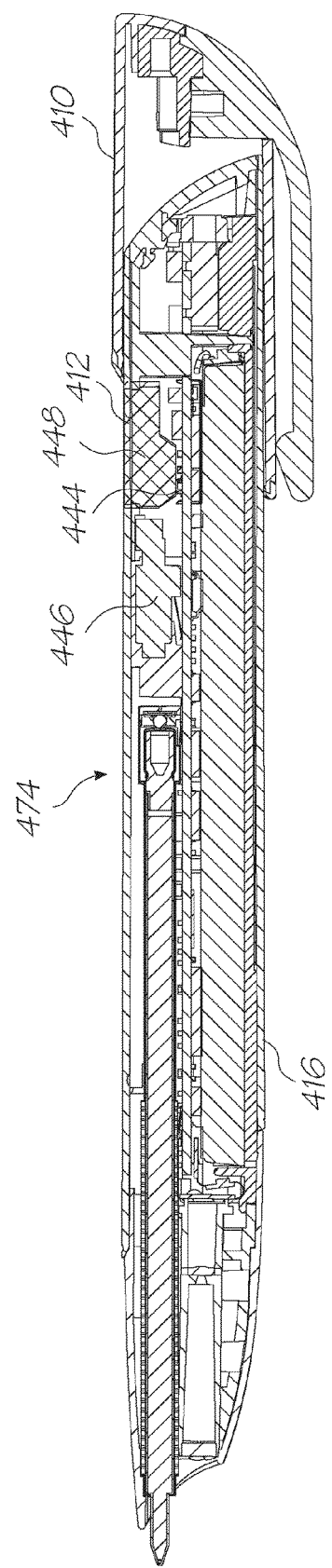

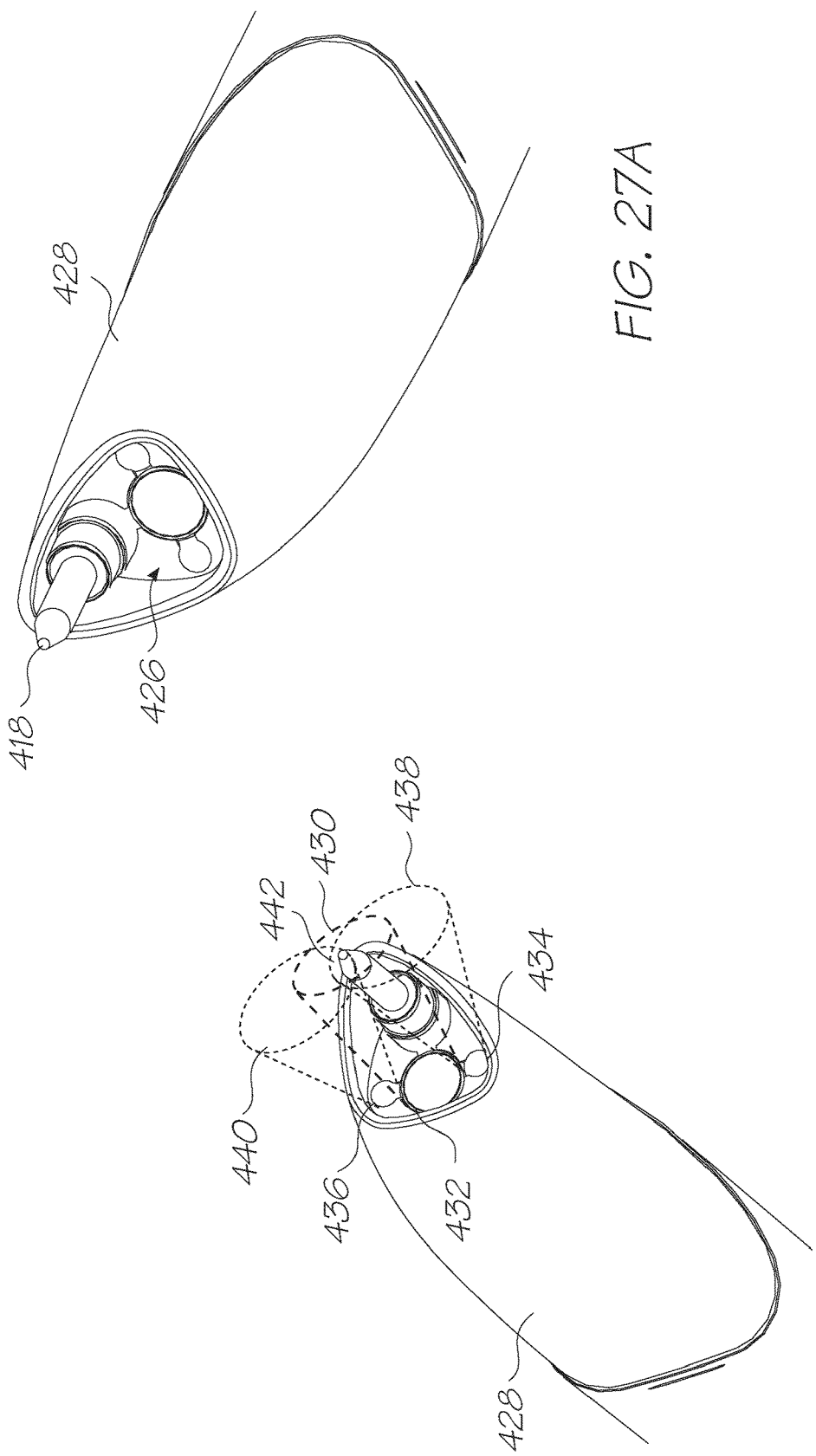

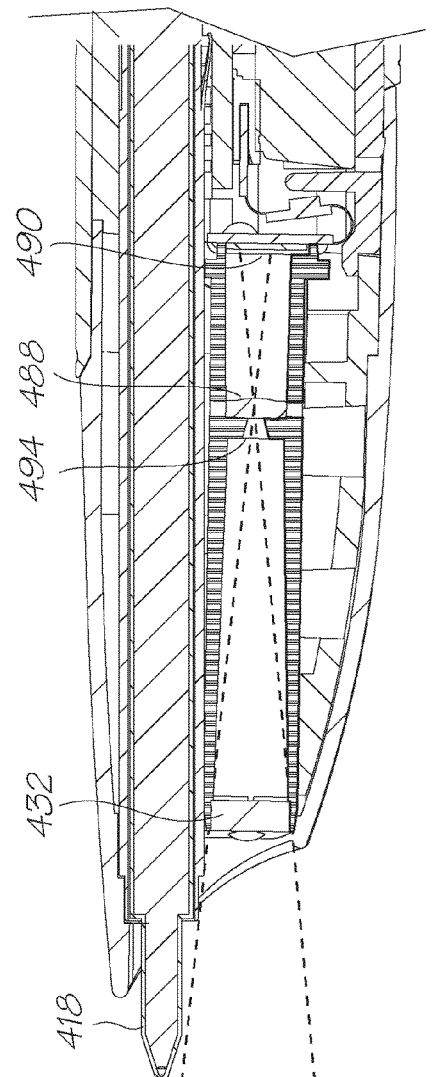
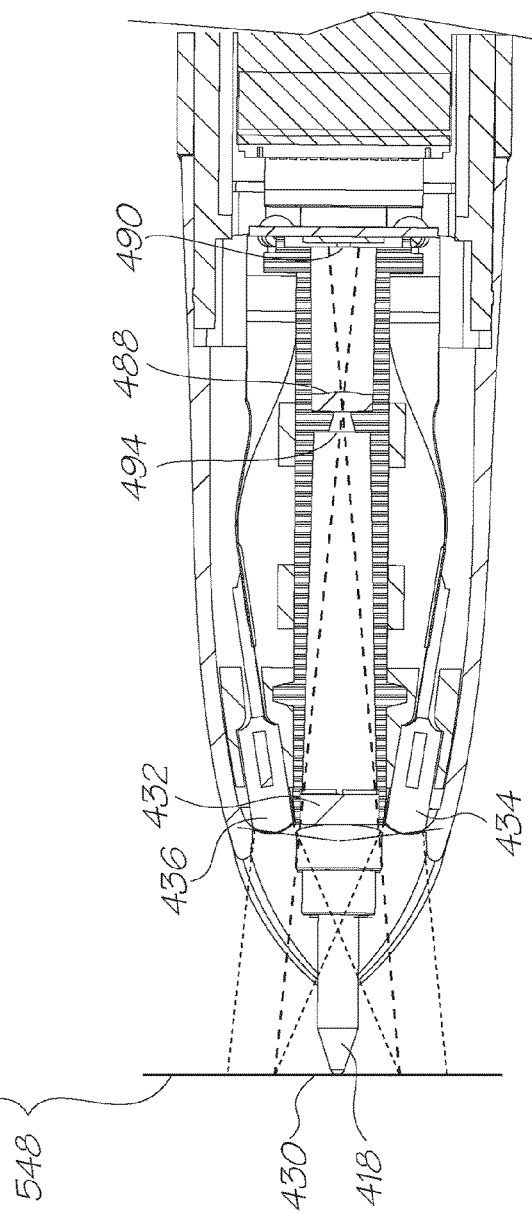

CODING PATTERN COMPRISING REGISTRATION SYMBOLS FOR IDENTIFYING THE CODING PATTERN

FIELD OF INVENTION

The present invention relates to a position-coding pattern on a surface.

COPENDING APPLICATIONS

The following applications have been filed by the Applicant simultaneously with the present application:
Ser. Nos. 12/539,580 12/539,583 12/539,586
The disclosures of these co-pending applications are incorporated herein by reference.

CROSS REFERENCES

The following patents or patent applications filed by the applicant or assignee of the present invention are hereby incorporated by cross-reference.

| | | | | |
|---|---|---|---|---|
| 11/488,162 | 10/815,621 | 10/815,635 | 7,357,323 | 11/488,162 |
| 7,605,940 | 7,506,168 | 7,905,401 | 7,457,961 | 7,457,007 |
| 7,204,941 | 7,278,727 | 7,423,145 | 7,122,076 | 7,156,289 |
| 7,721,948 | 6,720,985 | 7,295,839 | 7,593,899 | 7,068,382 |
| 7,094,910 | 7,062,651 | 6,644,642 | 6,549,935 | 6,987,573 |
| 6,727,996 | 6,760,119 | 7,064,851 | 6,290,349 | 6,428,155 |
| 6,785,016 | 6,831,682 | 6,741,871 | 6,965,439 | 7,663,780 |
| 6,870,966 | 6,474,888 | 6,724,374 | 6,788,982 | 7,263,270 |
| 6,788,293 | 6,737,591 | 7,369,265 | 10/778,056 | 10/778,061 |
| 11/193,482 | 7,055,739 | 6,830,196 | 7,182,247 | 7,082,562 |
| 7,918,404 | 7,108,192 | 10/492,169 | 7,469,062 | 7,359,551 |
| 7,444,021 | 7,308,148 | 6,957,768 | 7,170,499 | 11/856,061 |
| 7,762,453 | 7,821,507 | 11/754,310 | 12/015,507 | 7,148,345 |
| 8,028,925 | 12/025,762 | 12/025,765 | 7,416,280 | 6,902,255 |
| 6,755,509 | 12/178,611 | 8,091,792 | | |

BACKGROUND

The Applicant has previously described a method of enabling users to access information from a computer system via a printed substrate e.g. paper. The substrate has a coding pattern printed thereon, which is read by an optical sensing device when the user interacts with the substrate using the sensing device. A computer receives interaction data from the sensing device and uses this data to determine what action is being requested by the user. For example, a user may make handwritten input onto a form or make a selection gesture around a printed item. This input is interpreted by the computer system with reference to a page description corresponding to the printed substrate.

It would be desirable to improve the coding pattern printed on the substrate so as to maximize usage of images captured by the sensing device. It would be further desirable to provide variants of a position coding pattern, suitable for printing by different types of printer, where each variant is readable by the same optical reader.

SUMMARY OF INVENTION

In a first aspect, the present invention provides a substrate having a first coding pattern disposed on a surface thereof, the first coding pattern comprising:

a plurality of target elements defining a target grid, the target grid comprising a plurality of cells, wherein neighboring cells share target elements;
a plurality of data elements contained in each cell; and
a plurality of tags, each tag being defined by a first set of contiguous cells, each tag comprising respective tag data encoded by a respective set of the data elements,
wherein each cell comprises one or more registration symbols encoded by a respective set of the data elements, each of the one or more registration symbols identifying the cell as being contained in the first set and thereby contained in the first coding pattern.

The registration symbols advantageously provide a means by which the first coding pattern can be distinguished from other coding pattern(s) of the same general type.

Optionally, a number of cells contained in the first set identifies the first set and thereby the first coding pattern. Optionally, each of the registration symbols identifies the number of cells contained in the first set. Optionally, each registration symbol distinguishes the first coding pattern from a second coding pattern. Advantageously, the registration symbols identify the first coding pattern by identifying the number of cells contained in each tag. For example, a first coding pattern have contain nine cells per tag, whilst a second coding pattern may have four cells per tag.

Optionally, the first coding pattern and the second coding pattern are both readable and decodable by a same optical reader. Hence, the Netpage pen can read and decode different Netpage position-coding patterns, irrespective of the actual number of cells per tag. This enables different position-coding patterns to be used and printed, depending on the print capabilities of a printer Optionally, the second coding pattern comprises:
a plurality of target elements defining a target grid, the target grid comprising a plurality of cells, wherein neighboring cells share target elements;
a plurality of data elements contained in each cell; and
a plurality of tags, each tag being defined by a second set of contiguous cells, each tag comprising respective tag data encoded by a respective set of the data elements,
wherein the second set contains a different number of cells than the first set.

Hence, the second-position coding pattern is typically of the same general type as the first position-coding pattern.

Optionally, each cell of the first coding pattern and the second coding pattern comprises one or more registration symbols. A large number of registration symbols in each tag provides a high degree of redundancy, meaning that the pen can robustly recognize a particular coding pattern.

Optionally, the registration symbols in the first and second coding patterns are configured and positioned identically relative to target elements contained by each cell. The relative positioning of the registration symbols in both the first and second coding patterns is the same, so that the pen can find the registrations symbols before it identifies which coding pattern it is reading.

Optionally, the second coding pattern is adapted to be printed at a lower print resolution than the first coding pattern. Optionally, the second set contains a fewer number of cells than the first set.

Optionally, each registration symbol identifies a translation of the cell relative to a tag containing the cell. This enables alignment of the tag(s) with the target grid. Typically, a first translation codeword (e.g. 0, 1, 2) is reserved for the first coding pattern, whilst a second translation codeword (e.g. 3, 4) is reserved for the second coding pattern.

Optionally, each cell comprises a pair of orthogonal registration symbols, each orthogonal registration symbol identifying a respective orthogonal translation of the cell relative to a tag containing the cell. Hence, each regsistration symbol is identifies either an x-translation or a y-translation of a cell relative to a tag containing that cell.

Optionally, each tag is square and comprises $M^2$ contiguous square cells, wherein M is an integer having a value of at least 2. Typical tag sizes are M=2, 3 or 4. Preferably, M=2 or 3.

Optionally, M registration symbols in a row of M cells define a cyclic position code having minimum distance M, the code being defined by a first translation codeword.

Optionally, M registration symbols in a column of M cells define a cyclic position code having minimum distance M, the code being defined by a second translation codeword.

Optionally, each tag comprises N cells, and at least N registration symbols form a third translation codeword with minimum distance N, wherein N is an integer having a value of at least 4.

Advantageously, the first, second and/or third translation codewords enable robust alignment of the tag(s) with the target. For example, in a tag containing nine cells, four symbol errors in the third translation codeword may be corrected.

Optionally, each registration symbol further identifies an orientation of a layout of the tag data with respect to the target grid. The encoded orientation enables the Netpage pen to determine its orientation (yaw) relative to the tag data, and hence relative to the substrate.

Typically, the data elements are macrodots (i.e. readable marks in the form of dots). Typically, a portion of data is represented by m macrodots, each of the macrodots occupying a respective position from a plurality of predetermined possible positions p within the cell, the respective positions of the macrodots representing one of a plurality of possible data values, wherein m is an integer of 1 or more (usually 2 or more), and p>m (typically $p \geq 2m$). Encoding by multi-PPM in this way ensures uniform coverage of the substrate with macrodots, which helps to reduce visibility. Moreover, PPM encoding provides an internal luminescence reference for reading macrodots. For example, the darkest m macrodots in the p positions are taken to be the PPM data, without the need to refer to any external luminescence threshold value.

Optionally, each cell defines a symbol group, each symbol group comprising a plurality of Reed-Solomon symbols encoded by a plurality of the data elements.

Optionally, at least some of said tag data is encoded as a local codeword comprised of a set of the Reed-Solomon symbols. The local tag data typically identifies a location of the tag.

In a second aspect, there is provided a method of imaging either a first coding pattern or a second coding pattern disposed on a surface, the method comprising the steps of:
(a) operatively positioning an optical reader relative to the surface having either the first or second coding pattern disposed thereon;
(b) capturing an image of a portion of the first or second coding pattern, the first and second coding patterns each comprising:
  a plurality of target elements defining a target grid, the target grid comprising a plurality of cells, wherein neighboring cells share target elements;
  a plurality of data elements contained in each cell; and
  a plurality of tags, each tag being defined by a set of contiguous cells, each tag comprising respective tag data encoded by a respective set of the data elements,
wherein each cell comprises one or more registration symbols encoded by a respective set of the data elements;
(c) sampling and decoding at least one registration symbol contained in the imaged portion;
(d) determining, from the decoded registration symbol, an identifier of the first or second coding pattern, the identifier indicating a number of cells contained in each tag;
(e) determining, from the identifier, whether the optical reader is positioned relative to the first coding pattern or the second coding pattern; and
(f) using the indicated number of cells to sample and decode the tag data,
wherein a number of cells contained in each tag of the first coding pattern is different from a number of cells contained in each tag of the second coding pattern.

Optionally, each registration symbol identifies a translation of the cell relative to a tag containing the cell, the method further comprising the step of:
  using the translation to sample and decode the tag data.

Optionally, each registration symbol identifies an orientation of a layout of the tag data with respect to the target grid, the method further comprising the step of:
  using the orientation to sample and decode the tag data.

In a third aspect, there is provided a system for imaging either a first coding pattern or a second coding pattern, the system comprising:
(A) a substrate having either the first coding pattern or the second coding pattern disposed on a surface thereof, wherein the first and second coding patterns each comprises:
  a plurality of target elements defining a target grid, the target grid comprising a plurality of cells, wherein neighboring cells share target elements;
  a plurality of data elements contained in each cell; and
  a plurality of tags, each tag being defined by a set of contiguous cells, each tag comprising respective tag data encoded by a respective set of the data elements,
wherein each cell comprises one or more registration symbols encoded by a respective set of the data elements;
(B) an optical reader comprising:
  an image sensor for capturing an image of a portion of the first or second coding pattern; and
  a processor configured for performing the steps of:
    (i) sampling and decoding at least one registration symbol contained in the imaged portion;
    (ii) determining, from the decoded registration symbol, an identifier of the first or second coding pattern, the identifier indicating a number of cells contained in each tag;
    (iii) determining, from the identifier, whether the optical reader is positioned relative to the first coding pattern or the second coding pattern; and
    (iv) using the indicated number of cells to sample and decode the tag data,
wherein a number of cells contained in each tag of the first coding pattern is different from a number of cells contained in each tag of the second coding pattern.

Optionally, each registration symbol identifies a translation of the cell relative to a tag containing the cell, the processor being configured to perform the further step of:
  using the translation to sample and decode the tag data.

Optionally, each registration symbol identifies an orientation of a layout of the tag data with respect to the target grid, the processor being configure to perform the further step of:
  using the orientation to sample and decode the tag data.

In a fourth aspect, there is provided an optical reader for imaging either a first coding pattern or a second coding pattern, the first and second coding patterns each comprising:

a plurality of target elements defining a target grid, the target grid comprising a plurality of cells, wherein neighboring cells share target elements;

a plurality of data elements contained in each cell; and a plurality of tags, each tag being defined by a set of contiguous cells, each tag comprising respective tag data encoded by a respective set of the data elements, wherein each cell comprises one or more registration symbols encoded by a respective set of the data elements;

the optical reader comprising:

an image sensor for capturing an image of a portion of either first or second coding pattern; and a processor configured for performing the steps of:
(i) sampling and decoding at least one registration symbol contained in the imaged portion;
(ii) determining, from the decoded registration symbol, an identifier of the first or second coding pattern, the identifier indicating a number of cells contained in each tag;
(iii) determining, from the identifier, whether the optical reader is positioned relative to the first coding pattern or the second coding pattern; and
(iv) using the indicated number of cells to sample and decode the tag data, wherein a number of cells contained in each tag of the first coding pattern is different from a number of cells contained in each tag of the second coding pattern.

It will be appreciated that optional embodiments of the first aspect may also be optional embodiments of the second, third or fourth aspects.

In a fifth aspect, there is provided a substrate having a coding pattern disposed on a surface thereof, the coding pattern comprising:

a plurality of contiguous square tags of length l, each tag comprising x-coordinate data and y-coordinate data; and a plurality of data elements contained in each tag, the x-coordinate data being represented by a respective set of data elements and the y-coordinate data being represented by a respective set of data elements, wherein:

all the x-coordinate data is represented in a column of the tag parallel with a y-axis;

all the y-coordinate data is represented in a row of the tag parallel with an x-axis; and the column and the row each have a width v, such that any square portion of the coding pattern having a length (l+v) is guaranteed to contain the x-coordinate data and the y-coordinate data for a tag irrespective of whether a whole tag is contained in the portion.

The fifth aspect of the invention advantageously enables non-replication of coordinate data in each tag, which saves on tag space. Typically, x-coordinate data should be replicated in each vertical half of tag, and y-coordinate data should be replicated in each horizontal half of a tag. However, by encoding all x-coordinate data in one column, and all y-coordinate data in one row, the requirement for replication is obviated. If the column or row has a width v, then any square portion of length (l+v) is guaranteed to contain the relevant coordinate data. Moreover, if the width v corresponds to a width or length of a coordinate data symbol (depending on the shape and orientation of coordinate data symbols in the column or row), then it is ensured that any square portion of length (l+v) is guaranteed to contain the relevant coordinate data from spatially coherent samples i.e. from the same symbol, as opposed to partial symbols at opposite sides of a field of view.

Optionally, a plurality of target elements define a target grid, the target grid comprising a plurality of cells, wherein neighboring cells share target elements and wherein each tag is defined by a plurality of contiguous cells.

Optionally, each tag comprises $M^2$ contiguous square cells, wherein M is an integer having a value of at least 1. Typical tag sizes are M=2, 3 or 4. Preferably, M=2 or 3

Optionally, the data elements are macrodots, which are readable dot-like marks formed by a plurality of contiguous printed dots.

Optionally, v=ts, wherein: s is defined as a spacing between adjacent macrodots; and t is an integer value of 2 or more.

Optionally, the macrodots encode data values by pulse position modulation (PPM).

Optionally, a portion of data is represented by m macrodots, each of the macrodots occupying a respective position from a plurality of predetermined possible positions p within the cell, the respective positions of the macrodots representing one of a plurality of possible data values.

Optionally, the x-coordinate data is encoded as an x-coordinate codeword comprised of a respective set of the X-Reed-Solomon symbols, and the y-coordinate data is encoded as a y-coordinate codeword comprised of a respective set of the Y-Reed-Solomon symbols.

Optionally, the X-Reed-Solomon symbols are configured and oriented in the column so as to have the width v, and wherein the Y-Reed-Solomon symbols are configured and oriented in the row so as to have the width v.

Optionally, each tag comprises a plurality of common codewords, each common codeword being comprised of a respective set of the Reed-Solomon symbols, wherein the plurality of common codewords are defined as codewords common to a plurality of contiguous tags. A common codeword typically encodes a region ID or page ID for the substrate.

Optionally, each symbol group comprises a fragment of at least one of the common codewords, and contiguous symbol groups are arranged such that any tag-sized portion of the coding pattern is guaranteed to contain the plurality of common codewords irrespective of whether a whole tag is contained in the portion.

Optionally, each cell comprises a registration symbol encoded by a respective set of the data elements, the registration symbol identifying one or more of:

a translation of the cell relative to a tag containing the cell;

an orientation of a layout of tag data with respect to the target grid;

a number of cells in each tag;

a flag associated with the tag.

Optionally, each cell comprises first and second registration symbols, the first registration symbol identifying a first orthogonal translation of the cell, the second registration symbol identifying a second orthogonal translation of the cell.

Optionally, the first registration symbol identifies a first direction component of the orientation, and the second registration symbol identifies a second direction component of the orientation, such that the first and second orthogonal registration symbols together identify the orientation via the first and second direction components.

Optionally, the target elements are target dots and the data elements are macrodots, and each target dot has a diameter of at least twice that of each macrodot. This enables low-pass filtration of captured images to retain target elements but obscure macrodots.

In a sixth aspect, there is provided a method of imaging a coding pattern disposed on a surface of a substrate, the method comprising the steps of:

(a) operatively positioning an optical reader relative to the surface and capturing an image of a portion of the coding pattern, the coding pattern comprising:

a plurality of contiguous square tags of length l, each tag comprising x-coordinate data and y-coordinate data; and a plurality of data elements contained in each tag, the x-coordinate data being represented by a respective set of data elements and the y-coordinate data being represented by a respective set of data elements, wherein:

all the x-coordinate data is represented in a column of the tag parallel with a y-axis;

all the y-coordinate data is represented in a row of the tag parallel with an x-axis; and the column and the row each have a width v, (b) sampling and decoding x-coordinate data and y-coordinate data within the imaged portion; and (c) determining a position of the reader, wherein the imaged portion has a diameter of at least $(l+v)\sqrt{2}$ and less than $(2l)\sqrt{2}$.

Since the field of view of the optical reader is not required to have a diameter of at least two tag diameters, then the imaging requirements of the reader are reduced. Hence, the position-coding pattern not only provides efficient use of tag space, but also allows the imaging field of view of the tag reader to be minimized.

Optionally, each tag comprises a plurality of common codewords, each common codeword being comprised of a respective set of the Reed-Solomon symbols, wherein the plurality of common codewords are defined as codewords common to a plurality of contiguous tags, the method further comprising the step of:

sampling and decoding the common codeword within the imaged portion.

Optionally, one or more of the common codewords encode region identity data uniquely identifying a region of the surface, the method further comprising:

determining the an identity of the region.

Optionally, the region identity data uniquely identifies the substrate.

In a seventh aspect, there is provided a system for imaging a coding pattern disposed on a surface of a substrate, the system comprising:

(A) the substrate, wherein the coding pattern comprises:

a plurality of contiguous square tags of length l, each tag comprising x-coordinate data and y-coordinate data; and a plurality of data elements contained in each tag, the x-coordinate data being represented by a respective set of data elements and the y-coordinate data being represented by a respective set of data elements, wherein:

all the x-coordinate data is represented in a column of the tag parallel with a y-axis;

all the y-coordinate data is represented in a row of the tag parallel with an x-axis; and the column and the row each have a width v, (B) an optical reader comprising:

an image sensor for capturing an image of a portion of the coding pattern, the image sensor having a field-of-view of at least $(l+v)\sqrt{2}$ and less than $(2l)\sqrt{2}$; and a processor configured for performing the steps of:

(i) sampling and decoding x-coordinate data and y-coordinate data contained in an imaged portion; and (ii) determining a position of the reader.

In an eighth aspect, there is provided an optical reader for imaging a coding pattern disposed on a surface of a substrate, the coding pattern comprising:

a plurality of contiguous square tags of length l, each tag comprising x-coordinate data and y-coordinate data; and a plurality of data elements contained in each tag, the x-coordinate data being represented by a respective set of data elements and the y-coordinate data being represented by a respective set of data elements, wherein:

all the x-coordinate data is represented in a column of the tag parallel with a y-axis;

all the y-coordinate data is represented in a row of the tag parallel with an x-axis; and the column and the row each have a width v, the optical reader comprising:

an image sensor for capturing an image of a portion of the coding pattern, the image sensor having a field-of-view of at least $(l+v)\sqrt{2}$ and less than $(2l)\sqrt{2}$; and a processor configured for performing the steps of:

(i) sampling and decoding x-coordinate data and y-coordinate data contained in an imaged portion; and (ii) determining a position of the reader.

It will be appreciated that optional embodiments of the fifth aspect may also be optional embodiments of sixth, seventh and eighth aspects.

BRIEF DESCRIPTION OF DRAWINGS

Preferred and other embodiments of the invention will now be described, by way of non-limiting example only, with reference to the accompanying drawings, in which:

FIG. 26 is a lateral cross section through the pen;

FIG. 27A is a bottom and nib end partial perspective of the pen;

FIG. 27B is a bottom and nib end partial perspective with the fields of illumination and field of view of the sensor window shown in dotted outline;

FIG. 28 is a longitudinal cross section of the pen;

FIG. 29A is a partial longitudinal cross section of the nib and barrel molding;

FIG. 29B is a partial longitudinal cross section of the IR LED's and the barrel molding;

DETAILED DESCRIPTION OF PREFERRED AND OTHER EMBODIMENTS 1.1 Netpage System Architecture In a preferred embodiment, the invention is configured to work with the netpage networked computer system, an overview of which follows. In brief summary, the preferred form of the netpage system employs a computer interface in the form of a mapped surface, that is, a physical surface which contains references to a map of the surface maintained in a computer system. The map references can be queried by an appropriate sensing device. Depending upon the specific implementation, the map references may be encoded visibly or invisibly, and defined in such a way that a local query on the mapped surface yields an unambiguous map reference both within the map and among different maps. The computer system can contain information about features on the mapped surface, and such information can be retrieved based on map references supplied by a sensing device used with the mapped surface. The information thus retrieved can take the form of actions which are initiated by the computer system on behalf of the operator in response to the operator's interaction with the surface features.

In its preferred form, the netpage system relies on the production of, and human interaction with, netpages. These are pages of text, graphics and images printed on ordinary paper, but which work like interactive webpages. Information is encoded on each page using ink which is substantially invisible to the unaided human eye. The ink, however, and thereby the coded data, can be sensed by an optically imaging sensing device (or reader) and transmitted to the netpage system. The sensing device may take the form of a clicker (for clicking on a specific position on a surface), a pointer having a stylus (for pointing or gesturing on a surface using pointer strokes), or a pen having a marking nib (for marking a surface with ink when pointing, gesturing or writing on the surface).

References herein to "pen" or "netpage pen" are provided by way of example only. It will, of course, be appreciated that the pen may take the form of any of the sensing devices or readers described herein.

In one embodiment, active buttons and hyperlinks on each page can be clicked with the sensing device to request information from the network or to signal preferences to a network server. In one embodiment, text written by hand on a netpage is automatically recognized and converted to computer text in the netpage system, allowing forms to be filled in. In other embodiments, signatures recorded on a netpage are automatically verified, allowing e-commerce transactions to be securely authorized. In other embodiments, text on a netpage may be clicked or gestured to initiate a search based on keywords indicated by the user.

Figure 1:
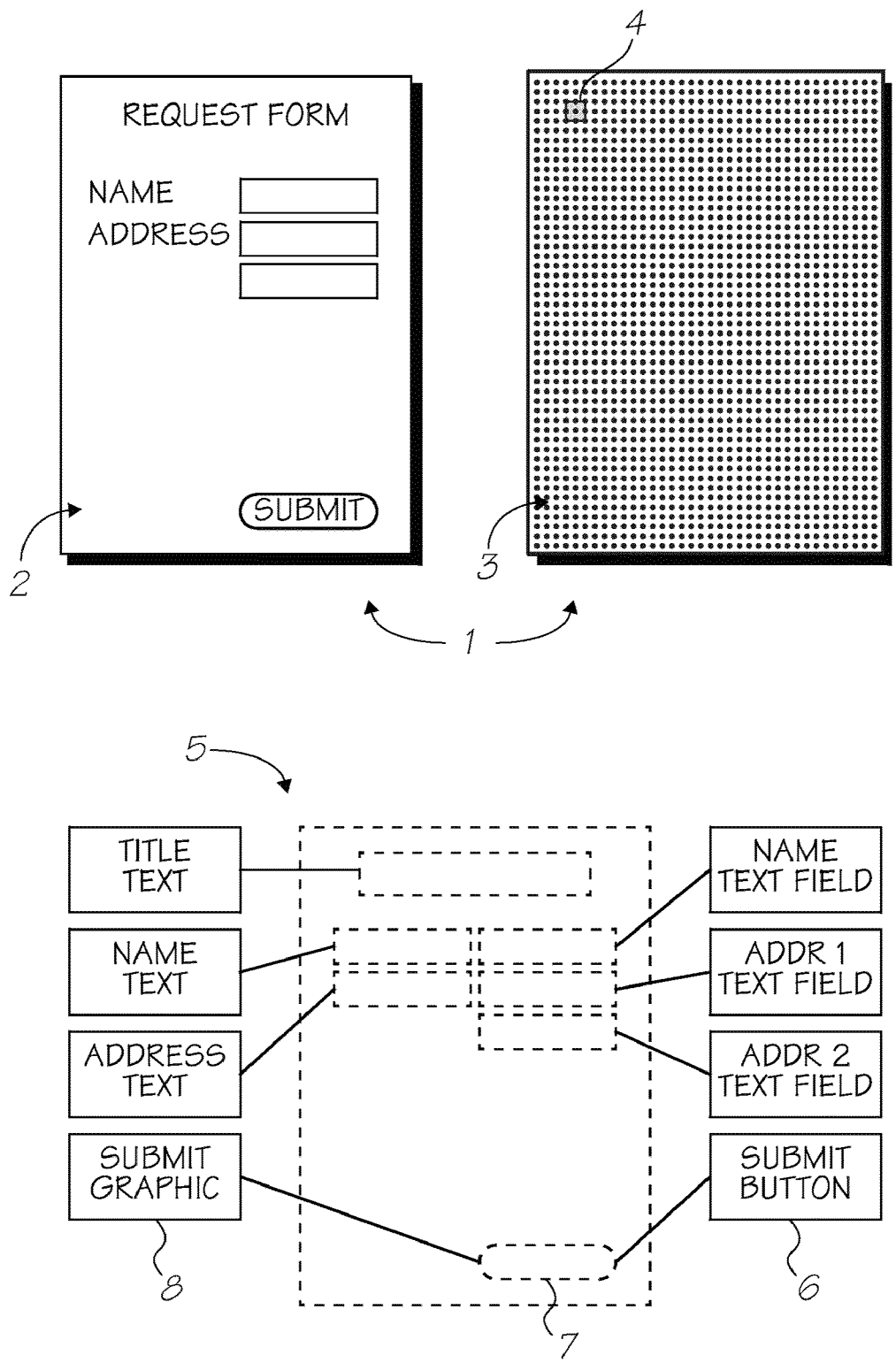
FIG. 1 is a schematic of a relationship between a sample printed netpage and its online page description.

As illustrated in FIG. 1, a printed netpage 1 can represent an interactive form which can be filled in by the user both physically, on the printed page, and "electronically", via communication between the pen and the netpage system. The example shows a "Request" form containing name and address fields and a submit button. The netpage 1 consists of graphic data 2, printed using visible ink, and a surface coding pattern 3 superimposed with the graphic data. The surface coding pattern 3 comprises a collection of tags 4. A typical tag 4 is shown in the shaded region of FIG. 1, although it will be appreciated that contiguous tags 4, defined by the coding pattern 3, are densely tiled over the whole netpage 1.

The corresponding page description 5, stored on the netpage network, describes the individual elements of the netpage. In particular it describes the type and spatial extent (zone) of each interactive element (i.e. text field or button in the example), to allow the netpage system to correctly interpret input via the netpage. The submit button 6, for example, has a zone 7 which corresponds to the spatial extent of the corresponding graphic 8.

Figure 2:
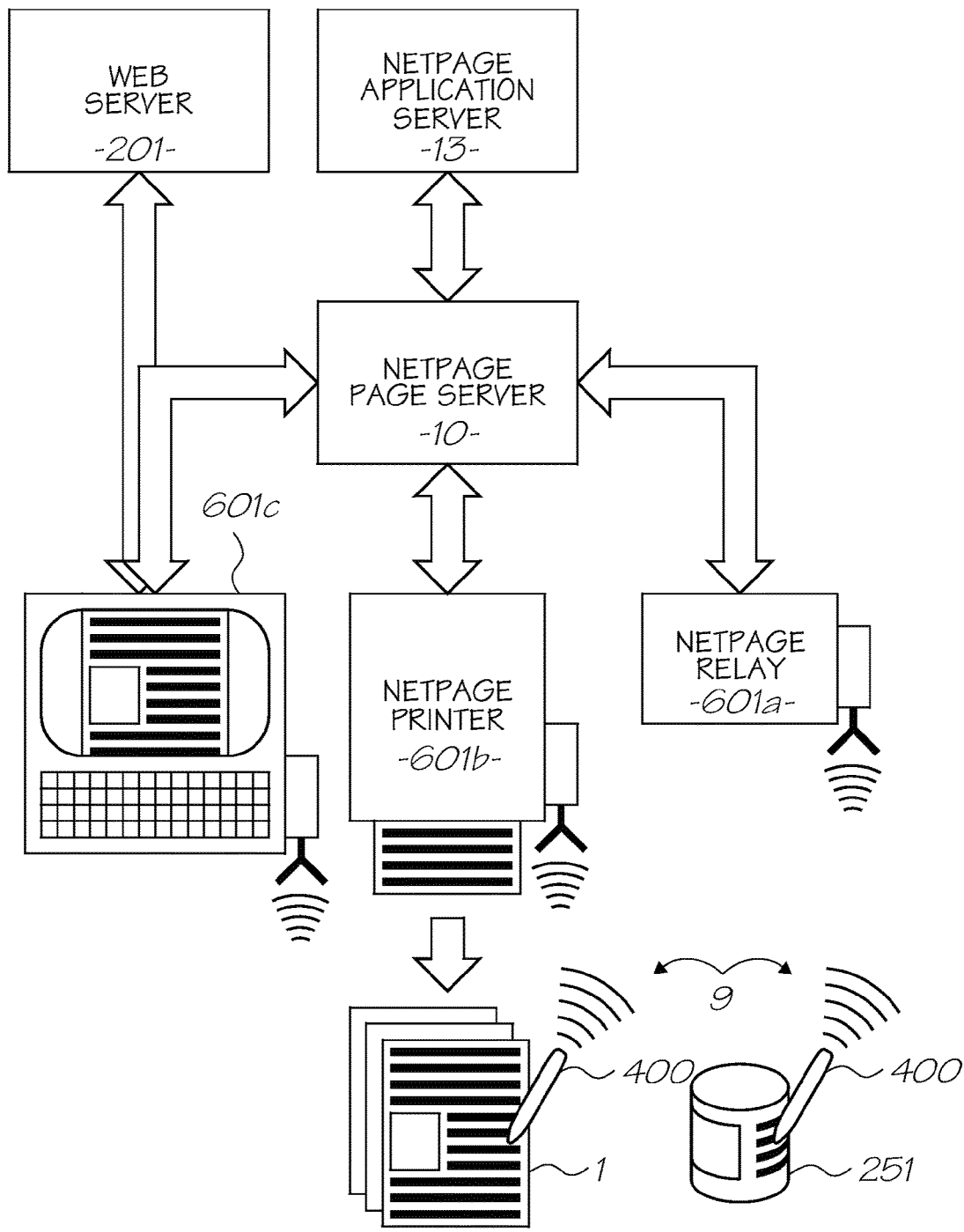
FIG. 2 shows an embodiment of basic netpage architecture with various alternatives for the relay device.

As illustrated in FIG. 2, a netpage sensing device 400, such as the pen described in Section 5, works in conjunction with a netpage relay device 601, which is an Internet-connected device for home, office or mobile use. The pen 400 is wireless and communicates securely with the netpage relay device 601 via a short-range radio link 9. In an alternative embodiment, the netpage pen 400 utilises a wired connection, such as a USB or other serial connection, to the relay device 601.

The relay device 601 performs the basic function of relaying interaction data to a page server 10, which interprets the interaction data. As shown in FIG. 2, the relay device 601 may, for example, take the form of a personal computer 601a, a netpage printer 601b or some other relay 601c (e.g. personal computer or mobile phone incorporating a web browser).

The netpage printer 601b is able to deliver, periodically or on demand, personalized newspapers, magazines, catalogs, brochures and other publications, all printed at high quality as interactive netpages. Unlike a personal computer, the netpage printer is an appliance which can be, for example, wall-mounted adjacent to an area where the morning news is first consumed, such as in a user's kitchen, near a breakfast table, or near the household's point of departure for the day. It also comes in tabletop, desktop, portable and miniature versions. Netpages printed on-demand at their point of consumption combine the ease-of-use of paper with the timeliness and interactivity of an interactive medium.

Alternatively, the netpage relay device 601 may be a portable device, such as a mobile phone or PDA, a laptop or desktop computer, or an information appliance connected to a shared display, such as a TV. If the relay device 601 is not a netpage printer 601b which prints netpages digitally and on demand, the netpages may be printed by traditional analog printing presses, using such techniques as offset lithography, flexography, screen printing, relief printing and rotogravure, as well as by digital printing presses, using techniques such as drop-on-demand inkjet, continuous inkjet, dye transfer, and laser printing.

As shown in FIG. 2, the netpage sensing device 400 interacts with a portion of the tag pattern on a printed netpage 1, or other printed substrate such as a label of a product item 251, and communicates, via a short-range radio link 9, the interaction to the relay device 601. The relay 601 sends corresponding interaction data to the relevant netpage page server 10 for interpretation. Raw data received from the sensing device 400 may be relayed directly to the page server 10 as interaction data. Alternatively, the interaction data may be encoded in the form of an interaction URI and transmitted to the page server 10 via a user's web browser 601*c*. The web browser 601*c* may then receive a URI from the page server 10 and access a webpage via a webserver 201. In some circumstances, the page server 10 may access application computer software running on a netpage application server 13.

The netpage relay device 601 can be configured to support any number of sensing devices, and a sensing device can work with any number of netpage relays. In the preferred implementation, each netpage sensing device 400 has a unique identifier. This allows each user to maintain a distinct profile with respect to a netpage page server 10 or application server 13.

Digital, on-demand delivery of netpages 1 may be performed by the netpage printer 601*b*, which exploits the growing availability of broadband Internet access. Netpage publication servers 14 on the netpage network are configured to deliver print-quality publications to netpage printers. Periodical publications are delivered automatically to subscribing netpage printers via pointcasting and multicasting Internet protocols. Personalized publications are filtered and formatted according to individual user profiles.

A netpage pen may be registered with a netpage registration server 11 and linked to one or more payment card accounts. This allows e-commerce payments to be securely authorized using the netpage pen. The netpage registration server compares the signature captured by the netpage pen with a previously registered signature, allowing it to authenticate the user's identity to an e-commerce server. Other biometrics can also be used to verify identity. One version of the netpage pen includes fingerprint scanning, verified in a similar way by the netpage registration server.

1.2 Netpages

Netpages are the foundation on which a netpage network is built. They provide a paper-based user interface to published information and interactive services.

As shown in FIG. 1, a netpage consists of a printed page (or other surface region) invisibly tagged with references to an online description 5 of the page. The online page description 5 is maintained persistently by the netpage page server 10. The page description describes the visible layout and content of the page, including text, graphics and images. It also describes the input elements on the page, including buttons, hyperlinks, and input fields. A netpage allows markings made with a netpage pen on its surface to be simultaneously captured and processed by the netpage system.

Multiple netpages (for example, those printed by analog printing presses) can share the same page description. However, to allow input through otherwise identical pages to be distinguished, each netpage may be assigned a unique page identifier. This page ID (or, more generally, region ID) has sufficient precision to distinguish between a very large number of netpages.

Each reference to the page description 5 is repeatedly encoded in the netpage pattern. Each tag (and/or a collection of contiguous tags) identifies the unique page on which it appears, and thereby indirectly identifies the page description 5. Each tag also identifies its own position on the page. Characteristics of the tags are described in more detail below.

Tags are typically printed in infrared-absorptive ink on any substrate which is infrared-reflective, such as ordinary paper, or in infrared fluorescing ink. Near-infrared wavelengths are invisible to the human eye but are easily sensed by a solid-state image sensor with an appropriate filter.

A tag is sensed by a 2D area image sensor in the netpage sensing device, and the tag data is transmitted to the netpage system via the nearest netpage relay device 601. The pen 400 is wireless and communicates with the netpage relay device 601 via a short-range radio link. It is important that the pen recognize the page ID and position on every interaction with the page, since the interaction is stateless. Tags are error-correctably encoded to make them partially tolerant to surface damage.

The netpage page server 10 maintains a unique page instance for each unique printed netpage, allowing it to maintain a distinct set of user-supplied values for input fields in the page description 5 for each printed netpage 1.

2 Netpage Tags 2.1 Tag Data Content

Each tag 4 identifies an absolute location of that tag within a region of a substrate.

Each interaction with a netpage should also provide a region identity together with the tag location. In a preferred embodiment, the region to which a tag refers coincides with an entire page, and the region ID is therefore synonymous with the page ID of the page on which the tag appears. In other embodiments, the region to which a tag refers can be an arbitrary subregion of a page or other surface. For example, it can coincide with the zone of an interactive element, in which case the region ID can directly identify the interactive element.

As described in the Applicant's previous applications (e.g. U.S. Pat. No. 6,832,717), the region identity may be encoded discretely in each tag 4. As will be described in more detail below, the region identity may be encoded by a plurality of contiguous tags in such a way that every interaction with the substrate still identifies the region identity, even if a whole tag is not in the field of view of the sensing device.

Each tag 4 should preferably identify an orientation of the tag relative to the substrate on which the tag is printed. Orientation data read from a tag enables the rotation (yaw) of the pen 400 relative to the substrate to be determined A tag 4 may also encode one or more flags which relate to the region as a whole or to an individual tag. One or more flag bits may, for example, signal a sensing device to provide feedback indicative of a function associated with the immediate area of the tag, without the sensing device having to refer to a description of the region. A netpage pen may, for example, illuminate an "active area" LED when in the zone of a hyperlink.

A tag 4 may also encode a digital signature or a fragment thereof. Tags encoding (partial) digital signatures are useful in applications where it is required to verify a product's authenticity. Such applications are described in, for example, US Publication No. 2007/0108285, the contents of which is herein incorporated by reference. The digital signature may be encoded in such a way that it can be retrieved from every interaction with the substrate. Alternatively, the digital signature may be encoded in such a way that it can be assembled from a random or partial scan of the substrate.

It will, of course, be appreciated that other types of information (e.g. tag size etc) may also be encoded into each tag or a plurality of tags, as will be explained in more detail below.

2.2 Position-Coding Pattern Variants

Although the adoption of a ubiquitous position-coding Netpage tag pattern for all users and all applications of the Netpage system is desirable, there may be technological or other barriers to such a ubiquitous coding pattern, at least during initial uptake of the Netpage system. One such barrier is a print resolution at which the position-coding pattern is printed. The Netpage tag pattern is advantageously designed to be printed using the Applicant's high-resolution (1600 dpi) pagewidth inkjet printers. The Netpage system complements the Applicant's inkjet printers, which are able to print Netpages having a high degree of functionality and position resolution via the printed tags 4. Ideally, Netpages are printed using 'Netpage-aware' printers, which are specifically tailored for printing Netpages.

However, the Netpage system is a generic page-based system that need not be inextricably tied to such printers. Preferably, Netpages should be printable using other types of printers, including existing lower resolution (e.g. 300 dpi) print-on-demand printers, such as laser printers and other inkjet printers. Netpages should also be printable using traditional analogue printing presses, which use, for example, established offset, rotogravure or photogravure printing techniques.

Self-evidently, position-coding patterns designed to be printed with high-resolution printers may not be printable using lower resolution printing technologies. If a dot spacing in the coding pattern is too small, then individual dots may not be resolvable by a relatively low resolution printing technology. Moreover, the resultant coding pattern, printed by a low-resolution printer, would not be readable by the Netpage pen 400 if adjacent dots are merged together.

One approach to this problem would be to provide a ubiquitous Netpage coding pattern, which is suitable for printing by both low-resolution and high-resolution printers. However, this is an unsatisfactory solution to the problem, because the higher degree of functionality and resolution of Netpages printed by the Applicant's pagewidth inkjet printers would be lost unnecessarily.

The present invention therefore provides two variants of the Netpage position-coding pattern, both of which are readable by the same Netpage pen 400. A first position-coding pattern (dubbed "Yarrow" by the present Applicant) is suitable for printing by the Applicant's high-resolution (1600 dpi) pagewidth inkjet printers and has a high degree of functionality and resolution. A second position-coding pattern (dubbed "Saffron" by the present Applicant) is suitable for printing by relatively low resolution (e.g. 300 dpi) printers and has a lower degree of functionality and resolution.

Importantly, both the first and second position-coding patterns are readable by the Netpage pen 400 by virtue of features common to each pattern. The Netpage pen 400 is able to determine whether it is reading the first or second position-coding pattern by decoding a registration symbol in each tag 4, as will be explained in more detail below. Once the pen 400 has recognized the coding pattern it is reading, decoding of tag data can proceed in accordance with that particular coding pattern.

3 First Position-Coding Pattern ("Yarrow")

3.1 Background

An earlier version of the first position-coding pattern ("Yarrow") was described in Applicant's U.S. application Ser. Nos. 12/178,611 and 12/178,619. This earlier version of the first position-coding pattern has been modified for compatibility with the second position-coding pattern described herein in Section 4. In particular, the registration symbols now map to translation code symbol values specifically identifying the first position-coding pattern, as described in more detail in Section 3.6.1. The complete first position-coding pattern will now be described in detail below.

3.2 General Tag Structure

Figure 3:
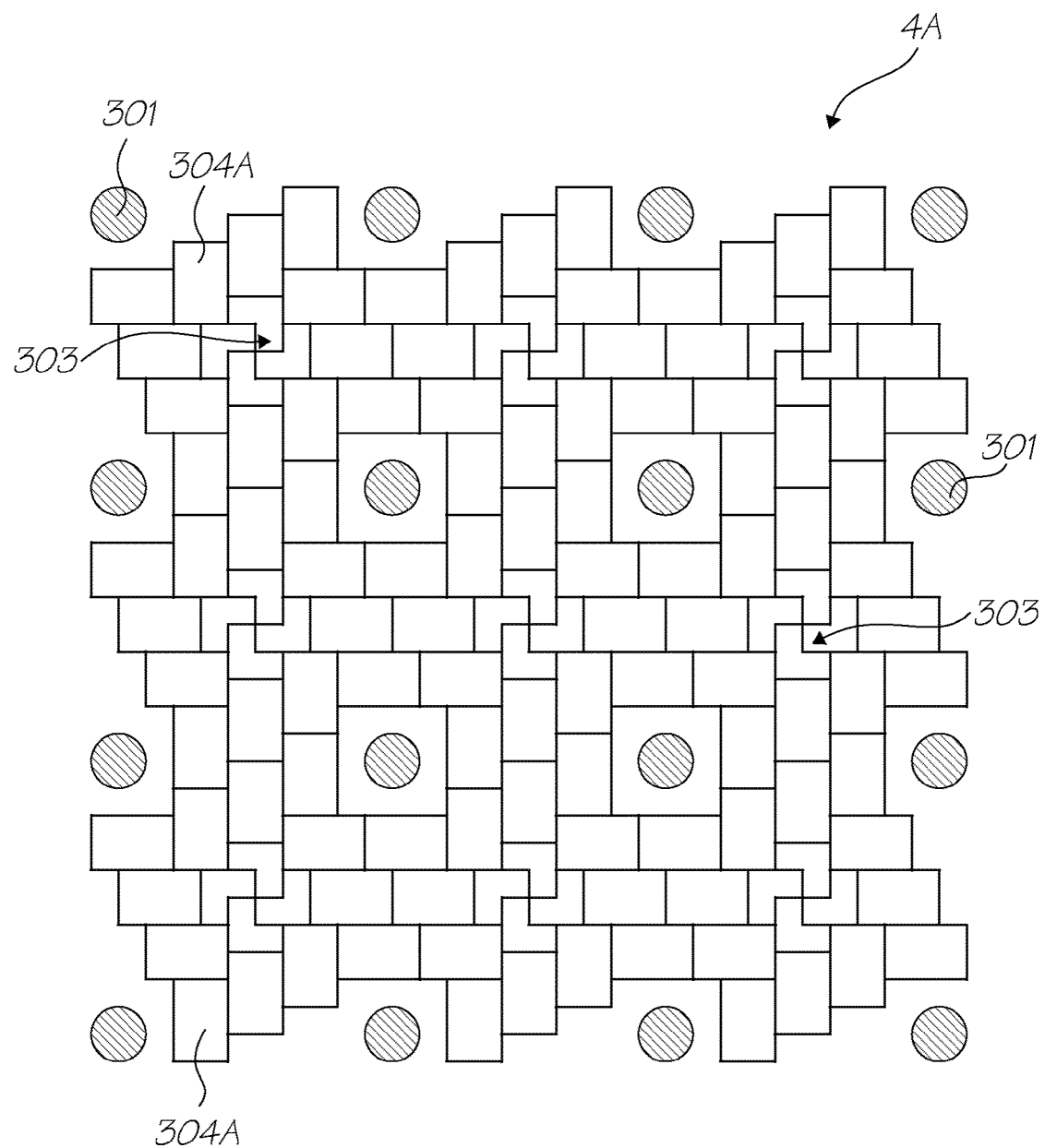
FIG. 3 shows the structure of a tag for a first position-coding pattern.
Figure 4:
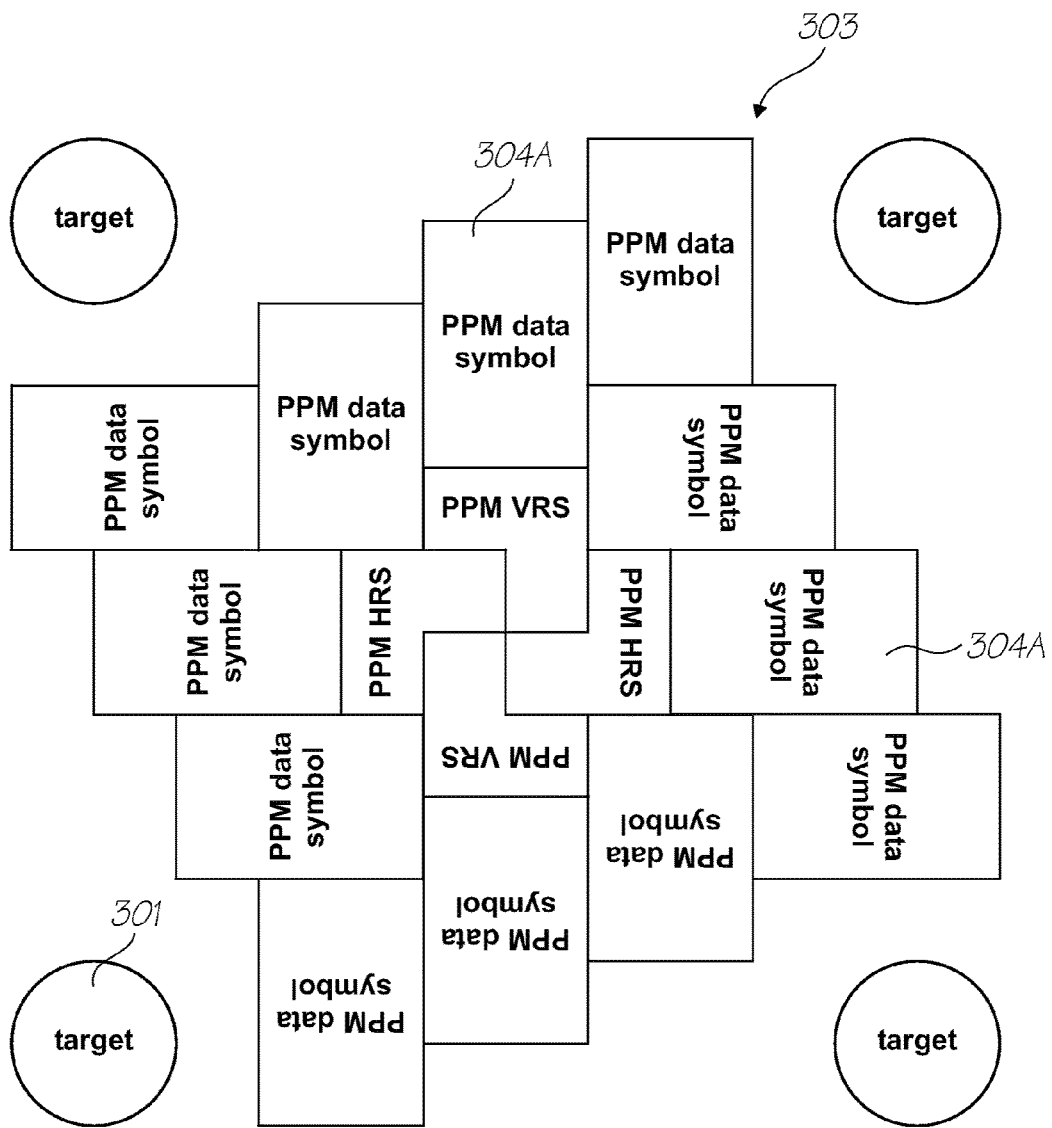
FIG. 4 shows a group of twelve data symbols and four targets for the first position-coding pattern.

As described above in connection with FIG. 1, the netpage surface coding generally consists of a dense planar tiling of tags. In the first position-coding pattern ("Yarrow"), each tag 4 is represented by two kinds of elements. Referring to FIGS. 3 and 4, the first kind of element is a target element. Target elements in the form of target dots 301 allow a tag 4 to be located in an image of a coded surface, and allow the perspective distortion of the tag to be inferred. The second kind of element is a data element in the form of a macrodot 302 (see FIG. 6). The macrodots 302 encode data values. As described in the Applicant's earlier disclosures (e.g. U.S. Pat. No. 6,832,717), the presence or absence of a macrodot was be used to represent a binary bit. However, the tag structure of the first position-coding pattern encodes a data value using multi-pulse position modulation, which is described in more detail in Section 3.3.

The coding pattern 3 is represented on the surface in such a way as to allow it to be acquired by an optical imaging system, and in particular by an optical system with a narrowband response in the near-infrared. The pattern 3 is typically printed onto the surface using a narrowband near-infrared ink.

FIG. 3 shows the structure of a complete tag 4A from the first position-coding pattern, with target elements 301 shown. The tag 4A is square and contains sixteen target elements. Those target elements 301 located at the edges and corners of the tag (twelve in total) are shared by adjacent tags and define the perimeter of the tag. The high number of target elements 301 advantageously facilitates accurate determination of a perspective distortion of the tag 4 when it is imaged by the sensing device 400. This improves the accuracy of tag sensing and, ultimately, position determination.

The tag 4A consists of a square array of nine symbol groups 303. Symbol groups 303 are demarcated by the target elements 301 so that each symbol group is contained within a square defined by four target elements. Adjacent symbol groups 303 are contiguous and share targets.

Since the target elements 301 are all identical, they do not demarcate one tag from its adjacent tags. Viewed purely at the level of target elements, only symbol groups 303, which define cells of a target grid, can be distinguished—the tags 4A themselves are indistinguishable by viewing only the target elements. Hence, tags 4A must be aligned with the target grid as part of tag decoding.

The tag 4A is designed to allow all tag data, with the exception of an embedded data object (see Section 3.9.3), to be recovered from an imaging field of view substantially the size of the tag.

3.3 Symbol Groups

As shown in FIG. 4, each of the nine symbol groups 303 comprises twelve data symbols 304A, each data symbol being part of a codeword. In addition, each symbol group 303 comprises a pair of registration symbols—a vertical registration symbol ('VRS') and a horizontal registration symbol ('HRS'). These allow the orientation and/or translation of the tag 4A in the field of view to be determined. Translation refers to the translation of tag(s) relative to the symbol groups 303 in the field of view. In other words, the registration symbols enable alignment of the 'invisible' tags with the target grid.

Each data symbol 304A is a multi-pulse position modulated (PPM) data symbol. Typically, each PPM data symbol 304A encodes a single 4-bit Reed-Solomon symbol using 3 macrodots in any of 6 positions $\{p_0, p_1, p_2, p_3, p_4, p_5\}$, i.e. using 3-6 pulse-position modulation (PPM). However, it will be appreciated that other forms of multi-PPM encoding are equally possible.

3-6 PPM has a range of 20 codes, or 4.3 bits, and is used for Reed-Solomon data symbols and Reed-Solomon redundancy symbols.

Each symbol group also contains a 2-6 PPM vertical registration symbol (VRS) and a 2-6 PPM horizontal registration symbol (HRS). These allow the orientation and translation of the tag in the field of view to be determined. This is described in more detail in Section 3.6.1.

Figure 5:
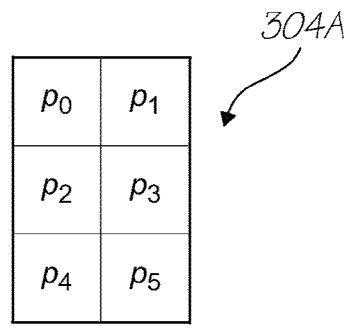
FIG. 5 shows the layout of a 2-6 PPM and 3-6 PPM data symbol for the first position-coding pattern.

FIG. 5 shows the layout for a 2-6 PPM or 3-6 PPM data symbol 304.

Table 1 defines the mapping from 3-6 PPM symbol values to Reed-Solomon symbol values. Unused symbol values can be treated as erasures.

TABLE 1

3-6PPM to Reed-Solomon symbol mapping

| 3-6PPM symbol value ($p_5$-$p_0$) | Corresponding Reed-Solomon symbol value (base 16) |
|---|---|
| 000111 | unused |
| 001011 | unused |
| 001101 | 0 |
| 001110 | 1 |
| 010011 | 2 |
| 010101 | 3 |
| 010110 | 4 |
| 011001 | 5 |
| 011010 | 6 |
| 011100 | 7 |
| 100011 | 8 |
| 100101 | 9 |
| 100110 | a |
| 101001 | b |
| 101010 | c |
| 101100 | d |
| 110001 | e |
| 110010 | f |
| 110100 | unused |
| 111000 | unused |

3.4 Targets and Macrodots

Figure 6:
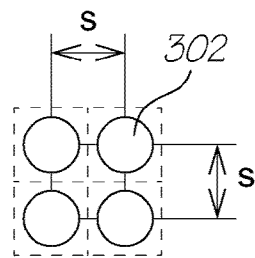
FIG. 6 shows the spacing of macrodot positions in the first position-coding pattern.

The spacing of macrodots 302 in both dimensions, as shown in FIG. 6, is specified by the parameter s. It has a nominal value of 127 μm, based on 8 dots printed at a pitch of 1600 dots per inch.

Only macrodots 302 are part of the representation of a symbol 304A in the pattern. The outline of a symbol 304A is shown in, for example, FIGS. 3 and 4 merely to elucidate more clearly the structure of the tag 4A.

A macrodot 302 is nominally square with a nominal size of (4/8)s. However, it is allowed to vary in size by ±10% according to the capabilities of the device used to produce the pattern.

A target 301 is nominally circular with a nominal diameter of (12/8)s. However, it is allowed to vary in size by ±10% according to the capabilities of the device used to produce the pattern.

Each symbol group 303 has a width of 10s. Therefore, each tag 4A has a width of 30s and a length of 30s. However, it should be noted from FIG. 3 that the tag 4A is configured so that some data symbols 304A extend beyond the perimeter edge of the tag 4A by one macrodot unit (1s), and interlock with complementary data symbols from adjacent tags. This arrangement provides a tessellated pattern of data symbols 304A within the target grid. From a data acquisition standpoint, tessellation of data symbols in this way increases the effective length of each tag 4A by one macrodot unit.

The macrodot spacing, and therefore the overall scale of the tag pattern, is allowed to vary between 127 μm and 120 μm according to the capabilities of the device used to produce the pattern. Any deviation from the nominal scale is recorded in each tag (via a macrodot size ID field) to allow accurate generation of position samples.

These tolerances are independent of one another. They may be refined with reference to particular printer characteristics.

3.5 Field of View

As mentioned above, the tag 4A is designed to allow all tag data to be recovered from an imaging field of view roughly the size of the tag. Any data common to a set of contiguous tags only needs to appear once within each tag, since fragments of the common data can be recovered from adjacent tags. Any data common only to a column or row of tags may appear twice within the tag—i.e. once in each horizontal half or vertical half of the tag respectively. However, special symbol arrangements may be used to ameliorate this requirement, as described in more detail in Section 3.6.3. Finally, any data unique to the tag must appear four times within the tag—i.e. once in each quadrant.

Although data which is common to a set of tags, in one or both spatial dimensions, may be decoded from fragments from adjacent tags, pulse-position modulated values are best decoded from spatially-coherent samples (i.e. from a whole symbol as opposed to partial symbols at opposite sides of the field of view), since this allows raw sample values to be compared without first being normalised. This implies that the field of view must be large enough to contain two complete copies of each such pulse-position modulated value. The tag is designed so that the maximum extent of a pulse-position modulated value is three macrodots (see FIG. 3). Making the field of view at least as large as the tag plus three macrodot units guarantees that pulse-position modulated values can be coherently sampled.

The only exceptions are the translation codes described in the next section, which are four macrodot units long. However, these are highly redundant and the loss of up to four symbols at the edge of the field of view is not a problem.

3.6 Encoded Codes and Codewords

In this section (Section 3.6), each symbol in FIGS. 8 to 12 is shown with a unique label. The label consists of an alphabetic prefix which identifies which codeword the symbol is part of, and a numeric suffix which indicates the index of the symbol within the codeword. For simplicity only data symbols 304A are shown, not registration symbols.

Although some symbol labels are shown rotated to indicate the symmetry of the layout of certain codewords, the layout of each symbol is determined by its position within a symbol group and not by the rotation of the symbol label (as described in, for example, the Applicant's US Publication No. 2006/146069).

3.6.1 Registration Symbols

Figure 7:
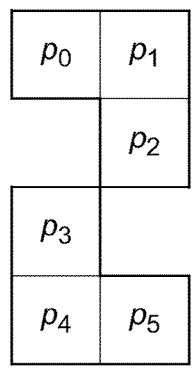
FIG. 7 shows the layout of a 2-6 PPM registration symbol for the first position-coding pattern.

Each registration symbol is encoded using 2-6 PPM. FIG. 7 shows the layout of the registration symbol.

As shown in FIG. 4, the horizontal and vertical registration symbols each appear once within a symbol group 303. The registration symbols of an entire tag typically indicate the vertical and horizontal translation of the tag by coding two orthogonal translation codes, and the orientation of the tag by coding two orthogonal direction codes.

Each registration symbol may also encode a one-bit symbol of a flag code (see Section 3.6.2).

Table 2 defines the mapping from 2-6 PPM registration symbol values to flag code, direction code and translation code symbol values.

TABLE 2

2-6PPM registration symbol values to flag code, direction code and translation code symbol mapping

| 2-6PPM symbol value $\{p_5\text{-}p_0\}$ | translation code symbol value | direction code symbol value | flag code symbol value |
|---|---|---|---|
| 001, 001 | 0 | 0 | unspecified |
| 100, 010 | | 1 | |
| 001, 010 | 1 | 0 | 0 |
| 000, 101 | | | 1 |
| 010, 100 | | 1 | 0 |
| 101, 000 | | | 1 |
| 010, 001 | 2 | 0 | unspecified |
| 100, 100 | | 1 | |
| 000, 011 | 3 | 0 | |
| 000, 110 | | 1 | |
| 011, 000 | 4 | 0 | |
| 110, 000 | | 1 | |
| 001, 100 | | unused | |
| 010, 010 | | | |
| 100, 001 | | | |

The first position-coding pattern ("Yarrow") uses the first eight registration symbol values in Table 2 i.e. those registration symbol values mapping to a translation code symbol value of 0, 1 or 2. In other words, if the registration symbol value maps to a translation code symbol value of 0, 1 or 2, then the position-coding pattern is identified as the first position-coding pattern having 9 symbol groups 303 contained in one tag 4A.

The additional translation code symbol values (i.e. 3 and 4) shown in Table 2 are reserved for the second position-coding pattern ("Saffron") described in Section 4.6.1. Thus, if the registration symbol value maps to a translation code symbol value of 3 or 4, then the position-coding pattern is identified as the second position-coding pattern having 4 symbol groups 303 contained in one tag 4B. In this way, the registration symbol provides a means of distinguishing the first position-coding pattern from the second position-coding pattern. Subsequent decoding of PPM data symbols proceeds in accordance with the position-coding pattern identified from decoding the registration symbol(s).

In the first position-coding pattern, each row of symbol groups and each column of symbol groups encodes a three-symbol 3-ary cyclic position code. (The Applicant's cyclic position codes are described in U.S. Pat. No. 7,082,562, the contents of which is herein incorporated by reference). The code consists of the codeword (0, 1, 2) and its cyclic shifts. The code has a minimum distance of 3, allowing a single symbol error to be corrected. For each of the two orthogonal translations, the three translation codes of an entire tag form a code with a minimum distance of 9, allowing 4 symbol errors to be corrected. If additional symbols are visible within the field of view then they can be used for additional redundancy.

The translation code symbol in the middle of the codeword (i.e. 1) is mapped to a set of 2-6 PPM symbol values that are each other's reverse, while the two translation code symbols at the ends of the codeword (i.e. 0 and 2) are each mapped to a set of 2-6 PPM symbol values that are the reverses of the 2-6 PPM symbol values in the other set. Thus a 0 read upside-down (i.e. rotated 180 degrees) becomes a 2, and vice versa, while a 1 read upside-down remains a 1. This allows translation to be determined independently of rotation.

Furthermore, in the first postion-codinig pattern, each 2-6 PPM symbol value and its reverse map to opposite direction code symbol values (Table 2). The vertical registration symbols of an entire tag encode 9 symbols of a vertical direction code. This has a minimum distance of 9, allowing 4 symbol errors to be corrected. The horizontal registration symbols of an entire tag encode 9 symbols of a horizontal direction code. This has a minimum distance of 9, allowing 4 symbol errors to be corrected. If additional symbols are visible within the field of view then they can be used for additional redundancy. Any erasures detected during decoding of a translation code can also be used during decoding of a direction code, and vice versa. Together the orthogonal direction codes allow the orientation of the tag to be determined.

The top left corner of an un-rotated tag is identified by a symbol group whose translation symbols are both zero and whose direction symbols are both zero.

3.6.2 Active Area Flag Code

The flag symbol consists of one bit of data, and is encoded in some of the vertical and horizontal registration symbols, as shown in Table 2.

The flag symbol is unique to a tag and is therefore coded redundantly in each quadrant of the tag. Since the flag symbol is encoded in each registration code symbol, it appears four times within each quadrant (assuming the central registration code symbols participate in each quadrant, as usually supported by the minimum field of view). Four symbols form a code with a minimum distance of 4, allowing 1 error to be corrected. If additional symbols are visible within the field of view then they can be used for additional redundancy. Any errors detected during decoding of translation and/or direction codes can also be used to flag erasures during decoding of the flag code. Since the flag code encodes the active area flag, it can meaningfully be interpreted as set even if ambiguous.

3.6.3 Coordinate Data

The tag 4A contains an x-coordinate codeword and a y-coordinate codeword used to encode the x and y coordinates of the tag respectively. The codewords are of a shortened $2^4$-ary (11, 3) or (11, 5) Reed-Solomon code. The tag therefore encodes either 12-bit or 20-bit coordinates. An (11, 5) code is used if the <region has long coordinates> flag in the region flags is set (see Table 5). An (11, 3) code is used otherwise.

Each x coordinate codeword is replicated twice within the tag—in each horizontal half ("north" and "south"), and is constant within the column of tags containing the tag. Likewise, each y coordinate codeword is replicated twice within the tag—in each vertical half ("east" and "west"), and is constant within the row of tags containing the tag. This guarantees that an image of the tag pattern large enough to contain a complete tag is guaranteed to contain a complete instance of each coordinate codeword, irrespective of the alignment of the image with the tag pattern. The instance of either coordinate codeword may consist of fragments from different tags.

It should be noted that, in the first position-coding pattern, some coordinate symbols are not replicated and are placed on the dividing line between the two halves of the tag. This arrangement saves tag space since there are not two complete replications of each x-coordinate codeword and each y-coordinate codeword contained in a tag. Since the field of view is at least three macrodot units larger than the tag (as discussed in Section 3.10), the coordinate symbols placed on the dividing line (having a width 2 macrodot units) are still captured when the surface is imaged. Hence, each interaction with the coded surface still provides the tag location.

Figure 8:
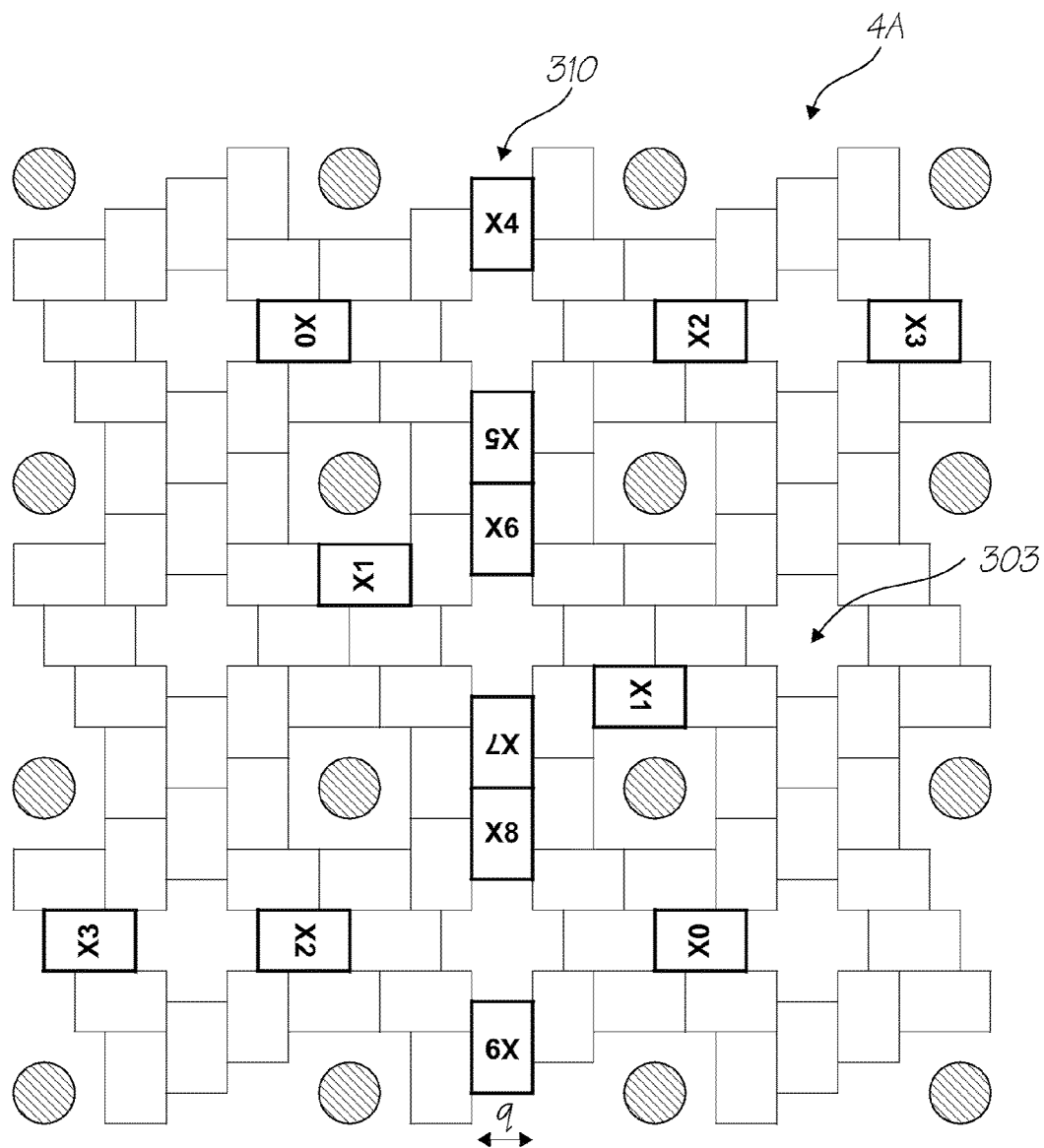
FIG. 8 shows a semi-replicated x-coordinate codeword X for the first position-coding pattern.
Figure 9:
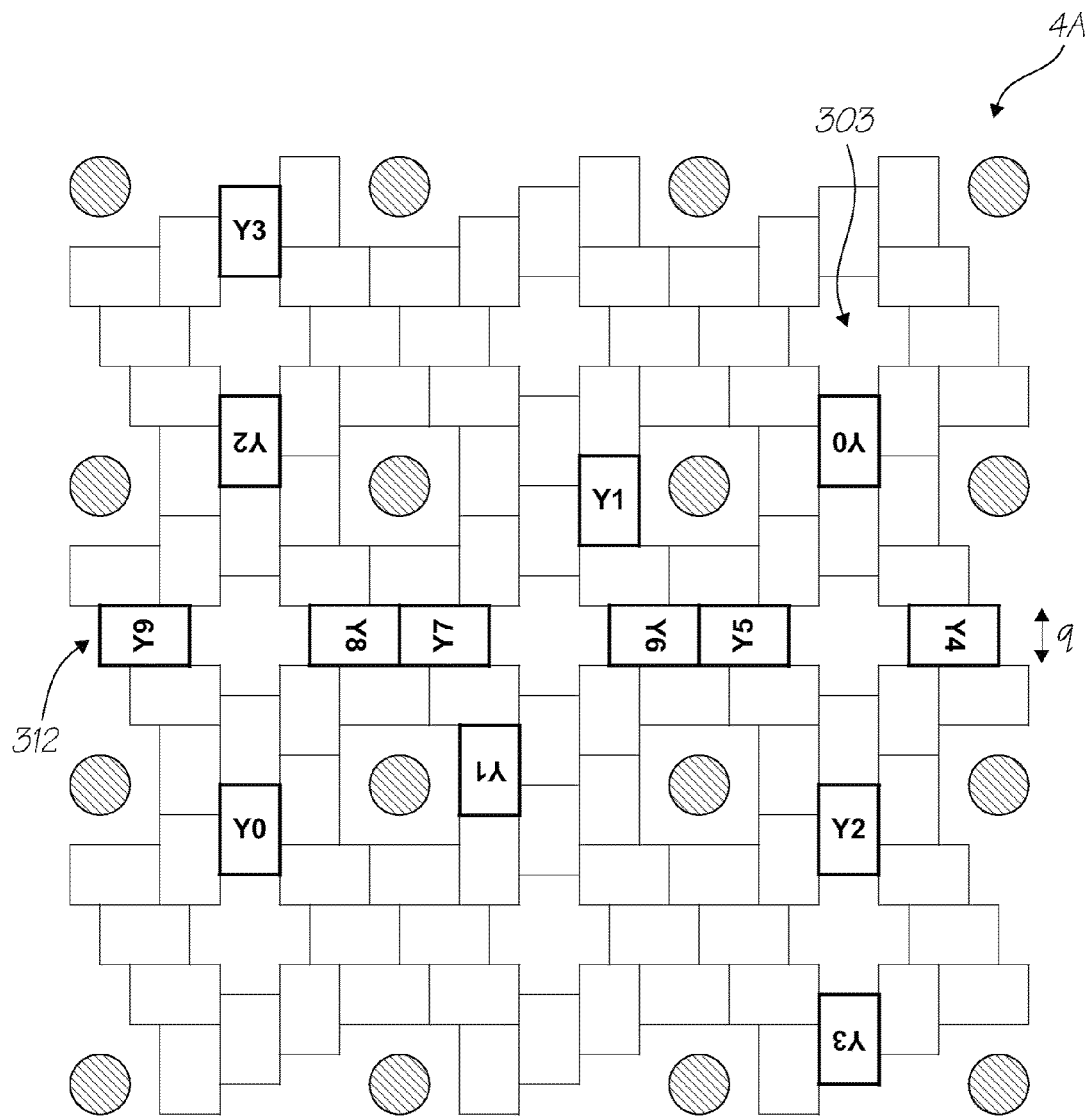
FIG. 9 shows a semi-replicated y-coordinate codeword Y for the first position-coding pattern.

The layout of the x-coordinate codeword is shown in FIG. 8. The layout of the y-coordinate codeword is shown in FIG. 9. It can be seen that x-coordinate symbols X4, X5, X6, X7, X8 and X9 are placed in a central column 310 of the tag 4A, which divides the eastern half of the tag from the western half. Likewise, the y-coordinate symbols Y4, Y5, Y6, Y7, Y8 and Y9 are placed in a central row 312 of the tag 4A, which divides the northern half of the tag from the southern half.

The central column 310 and central row 312 each have a width q, which corresponds to a width of 2s, where s is the macrodot spacing.

3.6.4 Common Data

The tag 4A contains four codewords A, B, C and D which encode information common to a set of contiguous tags in a surface region. The A codeword is of a $2^4$-ary (15, 5) Reed-Solomon code. The B, C and D codewords are of a $2^4$-ary (15, 7) or (15, 9) Reed-Solomon code. The tag therefore encodes either 112 or 136 bits of information common to a set of contiguous tags. A (15, 9) code is used for the B, C and D codewords if the <region has a long region ID> flag in the region flags is set (see Table 6). A (15, 7) code is used otherwise.

The common codewords are replicated throughout a tagged region. This guarantees that an image of the tag pattern large enough to contain a complete tag is guaranteed to contain a complete instance of each common codeword, irrespective of the alignment of the image with the tag pattern. The instance of each common codeword may consist of fragments from different tags.

Figure 10:
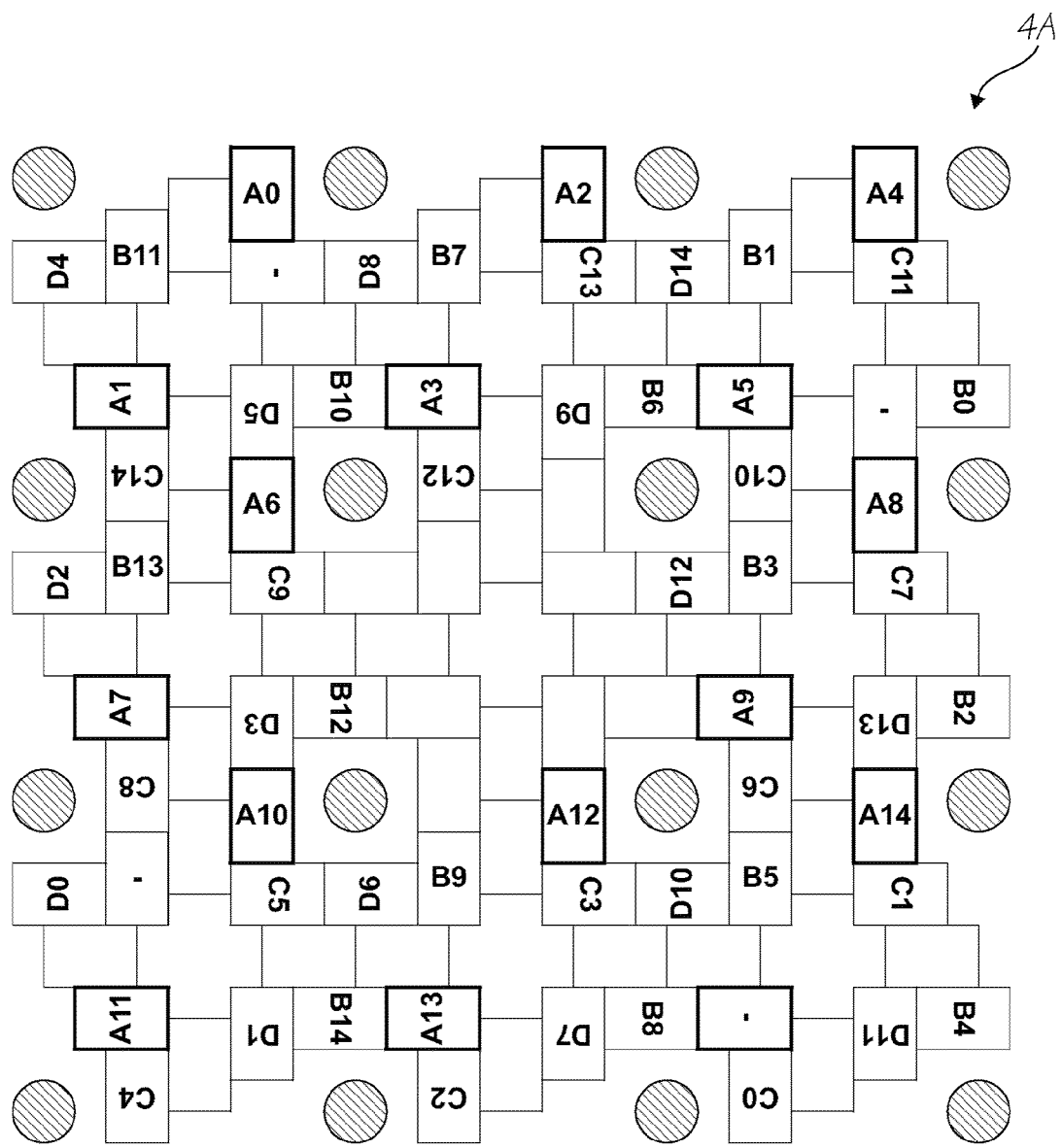
FIG. 10 shows common codewords A, B, C and D, with codeword A shown in bold outline for the first position-coding pattern.

The layout of the common codewords is shown in FIG. 10. The codewords have the same layout, rotated 90 degree relative to each other.

3.6.5 Optional Data

The tag optionally contains a codeword E. This codeword may be used to encode a secret-key signature or a fragment of an embedded data object. These are discussed further in Sections 3.6.6 and Section 3.9.3 respectively. The codeword is of a $2^4$-ary (15, 9) Reed-Solomon code.

Figure 11:
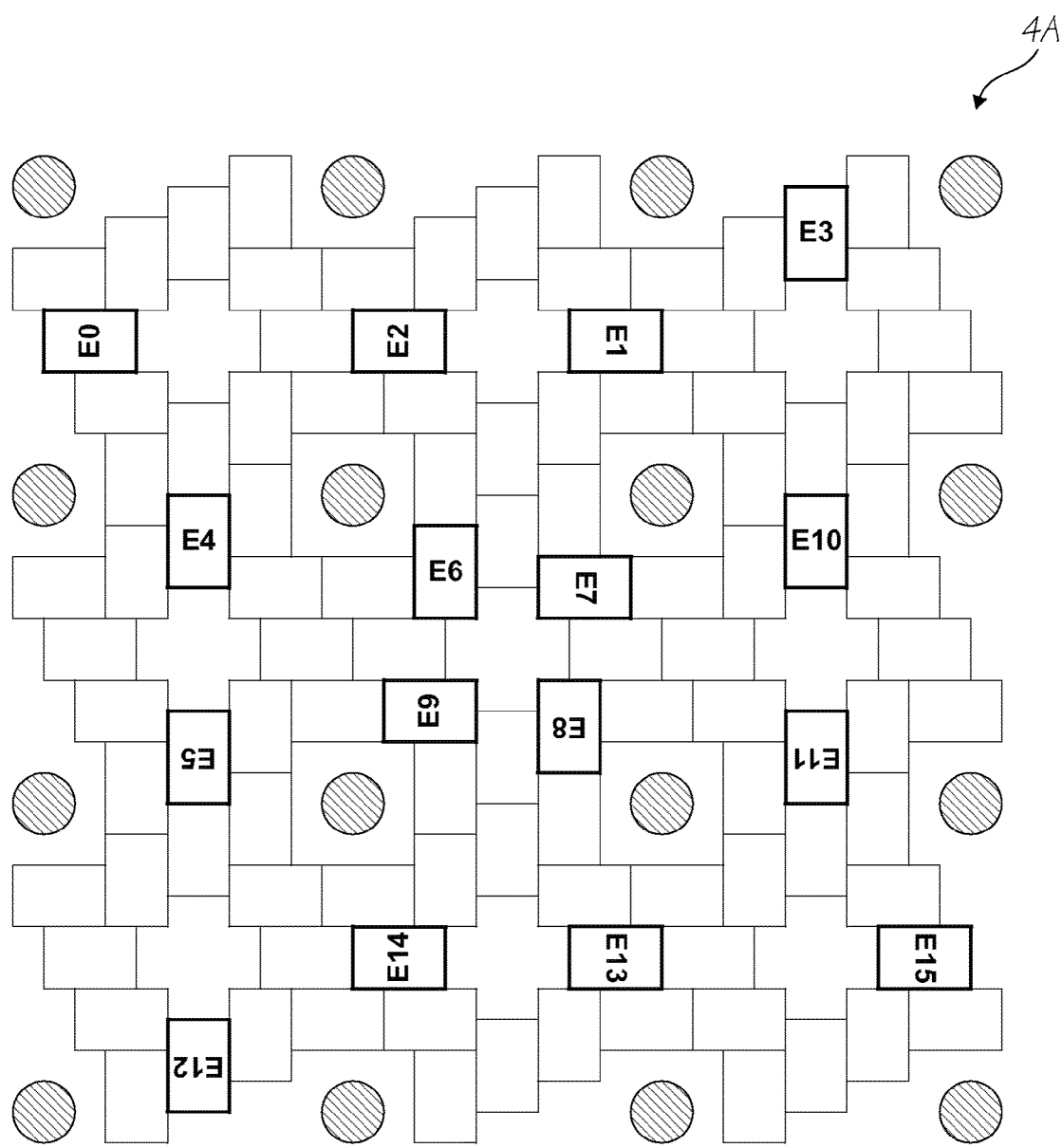
FIG. 11 shows an optional codeword E for the first position-coding pattern.

The layout of the optional codeword is shown in FIG. 11.

3.6.6 Secret-Key Signature

The tag optionally contains an entire secret-key digital signature common to a set of contiguous tags in a surface region. The signature consists of sixteen $2^4$-ary symbols (i.e. symbol E15 is also used). The tag therefore optionally encodes up to 64 bits of secret-key signature data.

The signature is replicated throughout a tagged region. This guarantees that an image of the tag pattern large enough to contain a complete tag is guaranteed to contain a complete instance of the signature, irrespective of the alignment of the image with the tag pattern. The instance of the signature may consist of fragments from different tags.

The signature, if present, is encoded in the E codeword described in Section 3.6.5.

Digital signatures are discussed further in Section 3.9.4.

3.6.7 Complete Tag

Figure 12:
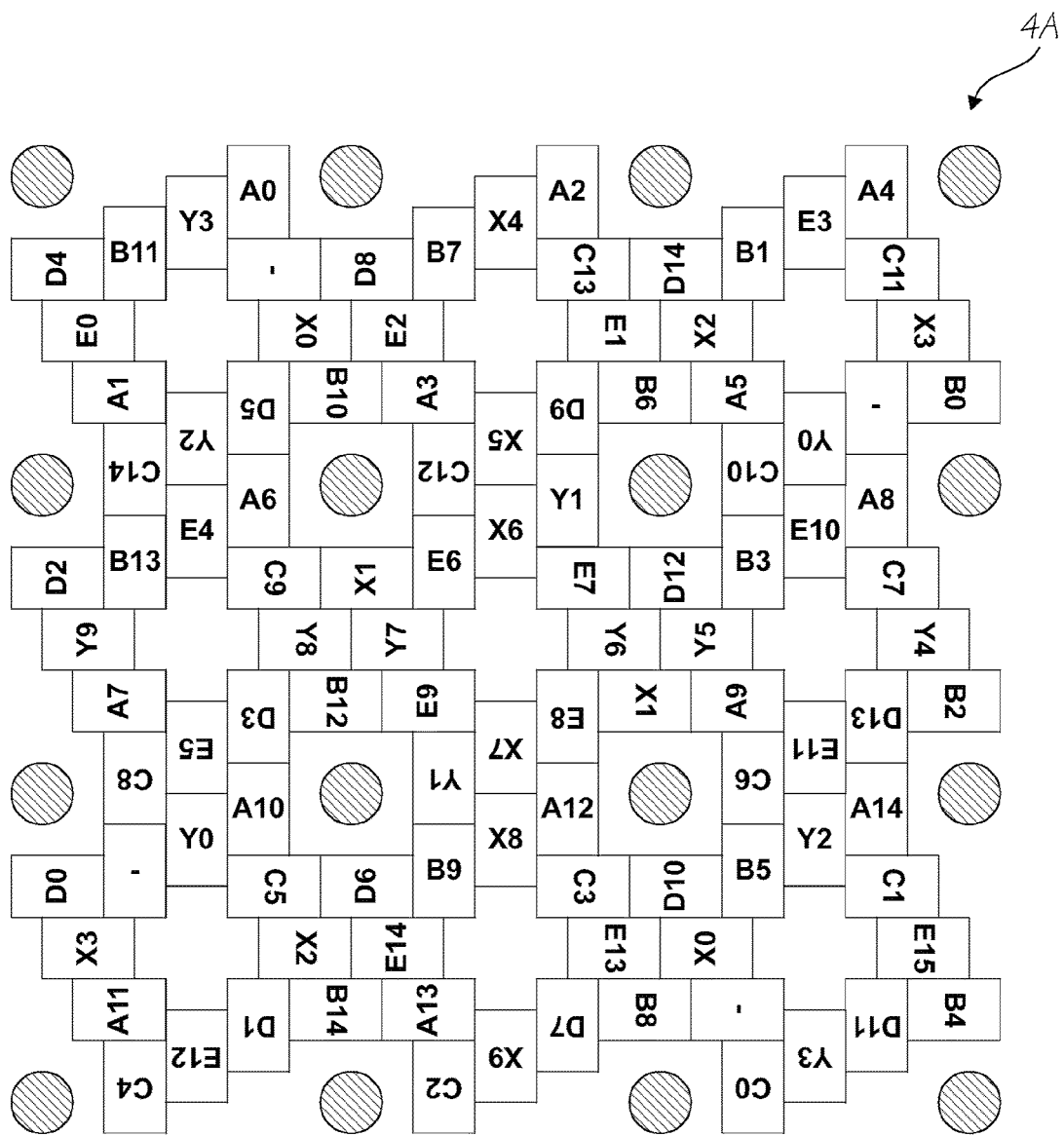
FIG. 12 shows the layout of a complete tag for the first position-coding pattern.

FIG. 12 shows the layout of the data of a complete tag, with each symbol group comprising ten data symbols. The vertical and horizontal registration symbols are not shown in FIG. 12.

3.7 Reed-Solomon Encoding
3.7.1 Reed-Solomon Codes

All data is encoded using a Reed-Solomon code defined over $GF(2^4)$. The code has a natural length n of 15. The dimension k of the code is chosen to balance the error correcting capacity and data capacity of the code, which are (n−k)/2 and k symbols respectively.

The code may be punctured, by removing high-order redundancy symbols, to obtain a code with reduced length and reduced error correcting capacity. The code may also be shortened, by replacing high-order data symbols with zeros, to obtain a code with reduced length and reduced data capacity. Both puncturing and shortening can be used to obtain a code with particular parameters. Shortening is preferred, where possible, since this avoids the need for erasure decoding.

The code has the following primitive polynominal:

$$p(x) = x^4 + x + 1$$

The code has the following generator polynominal:

$$g(x) = \prod_{i=1}^{n-k} (x+)$$

For a detailed description of Reed-Solomon codes, refer to Wicker, S. B. and V. K. Bhargava, eds., *Reed-Solomon Codes and Their Applications*, IEEE Press, 1994.

3.7.2 Codeword Organization

Figure 13:
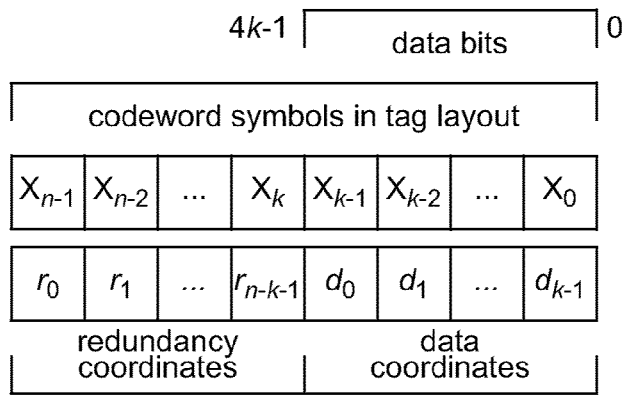
FIG. 13 shows the layout of a Reed-Solomon codeword for the first position-coding pattern.

As shown in FIG. 13, redundancy coordinates $r_i$ and data coordinates $d_i$ of the code are indexed from left to right according to the power of their corresponding polynomial terms. The symbols $X_i$ of a complete codeword are indexed from right to left to match the bit order of the data. The bit order within each symbol is the same as the overall bit order.

3.7.3 Code Instances

Table 3 defines the parameters of the different codes used in the tag.

TABLE 3

Codeword instances

| name | description | length (n) | dimension (k) | error-correcting capacity (symbols) | data capacity[a] (bits) |
|---|---|---|---|---|---|
| X, Y | coordinate codewords (see Section 3.6.3) | 11[a] | 3<br>5 | 4<br>3 | 12<br>20 |
| A | first common codeword | 15 | 5 | 5 | 20 |
| B, C, D | other common codewords (see Section 3.6.4) | 15 | 7<br>9 | 3<br>3 | 28<br>36 |
| E | optional codeword (see Section 3.6.5) | 15 | 9 | 3 | 36 |

[a]shortened

3.7.4 Cyclic Redundancy Check

The region ID is protected by a 16-bit cyclic redundancy check (CRC). This provides an added layer of error detection after Reed-Solomon error correction, in case a codeword containing a part of the region ID is mis-corrected.

The CRC has the following generator polynomial:

$$g(x)=x^{16}+x^{12}+x^{5}+1$$

The CRC is initialised to 0xFFFF. The most significant bit of the region ID is treated as the most significant coefficient of the data polynomial.

3.8 Tag Coordinate Space

The tag coordinate space has two orthogonal axes labelled x and y respectively. When the positive x axis points to the right then the positive y axis points down.

The surface coding does not specify the location of the tag coordinate space origin on a particular tagged surface, nor the orientation of the tag coordinate space with respect to the surface. This information is application-specific. For example, if the tagged surface is a sheet of paper, then the application which prints the tags onto the paper may record the actual offset and orientation, and these can be used to normalise any digital ink subsequently captured in conjunction with the surface.

The position encoded in a tag is defined in units of tags and is defined to be the centre of the top left target. The origin of a particular tag pattern is therefore the centre of the top left target of the tag that encodes coordinate pair (0, 0).

The surface coding is optionally displaced from its nominal position relative to the surface by an amount derived from the region ID. This ensures that the utilisation of a pagewidth digital printhead used to print the surface coding is uniform. The displacement of the surface coding is negative, hence the displacement of the region described by the surface coding is positive relative to the surface coding. The magnitude of the displacement is the region ID modulo the width of the tag in 1600 dpi dots (i.e. 240). To accommodate non-1600 dpi printers the actual magnitude of the displacement may vary from its nominal value by up to half the dot pitch of the printer.

3.9 Tag Information Content 3.9.1 Field Definitions

Table 4 defines the information fields embedded in the first position-coding pattern.

TABLE 4

| field | width (bits) | description |
|---|---|---|
| *unique to tag* | | |
| active area flag | 1 | A flag indicating whether the area[a] immediately surrounding a tag intersects an active area. |
| x coordinate | 12 or 20 | The unsigned x coordinate of the tag[b]. |
| y coordinate | 12 or 20 | The unsigned y coordinate of the tag[b]. |
| *common to tagged region* | | |
| encoding format | 2 | The format of the encoding. 0: the present encoding. Other values are reserved |
| region flags | 10 | Flags controlling the interpretation of region data (see Table 5). |
| coordinate precision | 2 | A value (p) indicating the precision of x and y coordinates according to the formula 8 + 4p. |
| macrodot size ID | 4 | The ID of the macrodot size. |
| region ID | 72 or 96 | The ID of the region containing the tags. |
| CRC | 16 | A CRC of the region ID (see Section 3.7.4) |
| secret-key signature | 64 | An optional secret-key signature of the region. |

[a] the diameter of the area, centered on the tag, is nominally 2.5 times the diagonal size of the tag; this is to accommodate the worst-case distance between the nib position and the imaged tag

[b] allows a coordinate value ranges of 14.8 m and 3.8 km for the minimum tag size of 3.6 mm (based on the minimum macrodot size of 120 microns and 30 macrodots per tag)

An active area is an area within which any captured input should be immediately forwarded to the corresponding Netpage server 10 for interpretation. This also allows the Netpage server 10 to signal to the user that the input has had an immediate effect. Since the server has access to precise region definitions, any active area indication in the surface coding can be imprecise so long as it is inclusive.

TABLE 5

Region flags

| bit | meaning |
|---|---|
| 0 | Region is interactive, i.e. x and y-coordinates are present. |
| 1 | Region is active, i.e. the entire region is an active area. Otherwise active areas are identified by individual tags' active area flags. |
| 2 | Region ID is not serialized[a]. |
| 3 | Region has secret-key signature (see Section 3.9.4) |
| 4 | Region has embedded data. |
| 5 | Embedded data is a public-key signature (see Sections 3.9.3 and 3.9.4). |
| 6 | Region has long coordinates[b]. |
| 7 | Region has a long region ID[c]. |
| 8 | Region ID is an EPC. |
| 9 | Region is displaced according to region ID |

[a]For an EPC this means that the serial number is replaced by a layout number, to allow the package design associated with a product to vary over time (see US 2007/0108285, the contents of which is herein incorporated by reference).
[b]Hence the X and Y Reed-Solomon codewords have less redundancy.
[c]Hence, the B, C and D Reed-Solomon codewords have less redundancy.

3.9.2 Mapping of Fields to Codewords

Table 6, Table 7 and Table 8 define how the information fields map to codewords in the first position-coding pattern.

TABLE 6

Mapping of fields to coordinate codewords X and Y

| codeword | field | X and Y codeword data capacity | field width | field bits | codeword bits |
|---|---|---|---|---|---|
| X | x coordinate | 12 20 | | all | all |
| Y | y coordinate | 12 20 | | all | all |

TABLE 7

Mapping of fields to common codewords A, B, C and D

| codeword | field | A, B, C and D codeword data capacity | field width | field bits | codeword bits |
|---|---|---|---|---|---|
| A | encoding format | any | 2 | all | 1:0 |
|   | region flags |  | 10 | all | 11:2 |
|   | macrodot size ID |  | 4 | all | 15:12 |
|   | region ID | 28 36 | 4 | 71:68 95:92 | 19:16 |
| B | CRC | any | 16 | all | 15:0 |
|   | region ID | 28 36 | 12 20 | 11:0 19:0 | 27:16 35:16 |
| C | region ID | 28 36 |  | 39:12 55:20 | all |
| D | region ID | 28 36 |  | 67:40 91:56 | all |

TABLE 8

Mapping of fields to optional codeword E

| codeword | field | E codeword data capacity | field width | field bits | codeword bits |
|---|---|---|---|---|---|
| E | data fragment | 36 |  | all | all |
|   | secret-key digital signature | 64[a] |  | all | all |

[a]Entire codeword (including 16th symbol) is used for data i.e. there is no redundancy As shown in Table 8, codeword E either contains a data fragment or a secret-key signature. These are described in Section 3.9.3 and Section 3.9.4 respectively. The secret-key signature is present in a particular tag if the <region has secret-key signature> flag in the region flags is set, and the tag's active area flag is set. The data fragment is present in a particular tag if the <region contains embedded data> flag in the region flags is set and the tag does not already contain a secret-key signature.

When the region flags indicate that a particular codeword is absent then the codeword is not coded in the tag pattern, i.e. there are no macrodots representing the codeword. This applies to the X, Y and E codewords i.e. the X and Y codewords are present if the <region is interactive> flag in the region flags is set. The E codeword is present if a secret-key signature or data fragment is present.

3.9.3 Embedded Data Object

If the <region has embedded data> flag in the region flags is set then the surface coding contains embedded data. The embedded data is encoded in multiple contiguous tags' data fragments, and is replicated in the surface coding as many times as it will fit.

The embedded data is encoded in such a way that a random and partial scan of the surface coding containing the embedded data can be sufficient to retrieve the entire data. The scanning system reassembles the data from retrieved fragments, and reports to the user when sufficient fragments have been retrieved without error.

As shown in Table 9, each block has a data capacity of 176-bits. The block data is encoded in the data fragments of a contiguous group of six tags arranged in a 3×2 rectangle.

The block parameters are as defined in Table 9. The E codeword of each tag may encode a fragment of the embedded data.

TABLE 9

Block parameters

| parameter | value | description |
|---|---|---|
| w | 3 | The width of the block, in tags |
| h | 2 | The height of the block, in tags. |
| b | 176 | The data capacity of the block, in bits |

If the E codeword of a particular tag does not contain a fragment of the embedded data, then the pen 400 can discover this implicitly by the failure of the codeword to decode, or explicitly from the tag's active area flag.

Data of arbitrary size may be encoded into a superblock consisting of a contiguous set of blocks, typically arranged in a rectangle. The size of the superblock may be encoded in each block.

The superblock is replicated in the surface coding as many times as it will fit, including partially along the edges of the surface coding.

The data encoded in the superblock may include, for example, more precise type information, more precise size information, and more extensive error detection and/or correction data.

3.9.4 Digital Signatures

As described in Section 3.6.6, a region may contain a digital signature.

If the <region has a secret-key signature> flag in the region flags is set, then the region has a secret-key digital signature. In an online environment the secret-key signature can be verified, in conjunction with the region ID, by querying a server with knowledge of the secret-key signature or the corresponding secret key.

If the region contains embedded data and the <embedded data is a public-key signature> flag in the region flag is set, then the surface coding contains an embedded public-key digital signature of the region ID.

In an online environment any number of signature fragments can be used, in conjunction with the region ID and optionally the secret-key signature, to validate the public-key signature by querying a server with knowledge of the full public-key signature or the corresponding private key.

In an offline (or online) environment the entire public-key signature can be recovered by reading multiple tags, and can then be verified using the corresponding public signature key. The actual length and type of the signature are determined from the region ID during signature validation i.e. typically from a previously-retrieved digital signature associated with a sequence of region IDs.

Digital signature verification is discussed in the Applicant's US Publication No. 2007/0108285, the contents of which are herein incorporated by reference.

3.10 Tag Imaging

The minimum imaging field of view required to guarantee acquisition of data from an entire tag 4A has a diameter of 46.7s (i.e. $((3 \times 10)+3)\sqrt{2}s$), allowing for arbitrary rotation and translation of the surface coding in the field of view. Notably, the imaging field of view does not have to be large enough to guarantee capture of an entire tag—the arrangement of the data symbols within each tag ensures that a any square portion of length (l+3s) captures the requisite information in full, irrespective of whether a whole tag is actually visible in the field-of-view. As used herein, l is defined as the length of a tag.

In terms of imaging the coding pattern, the imaging field-of-view is typically a circle. Accordingly, the imaging field-of-view should preferably have diameter of at least $(l+3s)\sqrt{2}$ and less than two tag diameters. Importantly, the field-of-view is not required to be at least two tag diameters, in contrast with prior art tag designs, because it is not essential to capture an entire tag 4A in the field of view.

The extra three macrodot units ensure that pulse-position modulated values can be decoded from spatially coherent samples. Furthermore, the extra three macrodot units ensure that all requisite data symbols 304A can be read with each interaction. These include the coordinate symbols from a central column or row of a tag (see Section 3.6.3) having a width of 2s.

In the present context, a "tag diameter" is given to mean the length of a tag diagonal.

Given a maximum macrodot spacing of 127 microns, this gives a required field of view of 5.93 mm.

4 Second Position-Coding Pattern ("Saffron")

4.1 Background

As will be appreciated from the following description, the second position-coding pattern bears many similarities with the first position coding pattern. The most notable difference is that each tag comprises 4 rather than 9 symbol groups 303. Furthermore, the registration symbols in the second position-coding pattern map to translation code symbol values (3, 4) specifically identifying the second position-coding pattern, as described earlier in Section 3.6.1. The complete second position-coding pattern will now be described in detail below.

4.2 General Tag Structure

Figure 14:
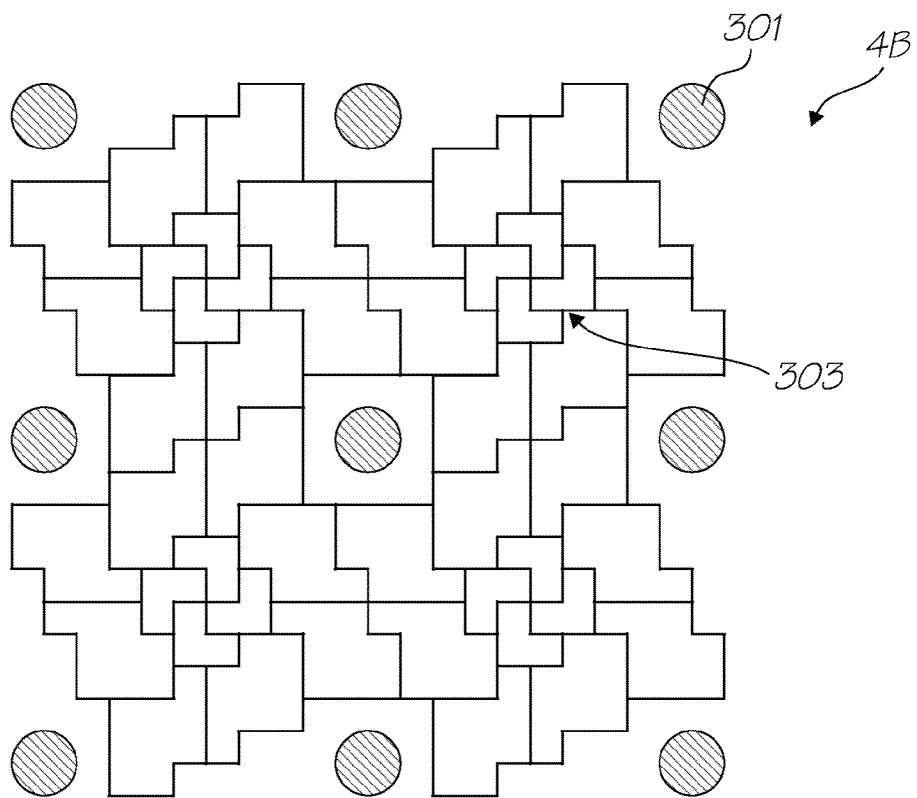
FIG. 14 shows the structure of a tag for a second position-coding pattern.
Figure 15:
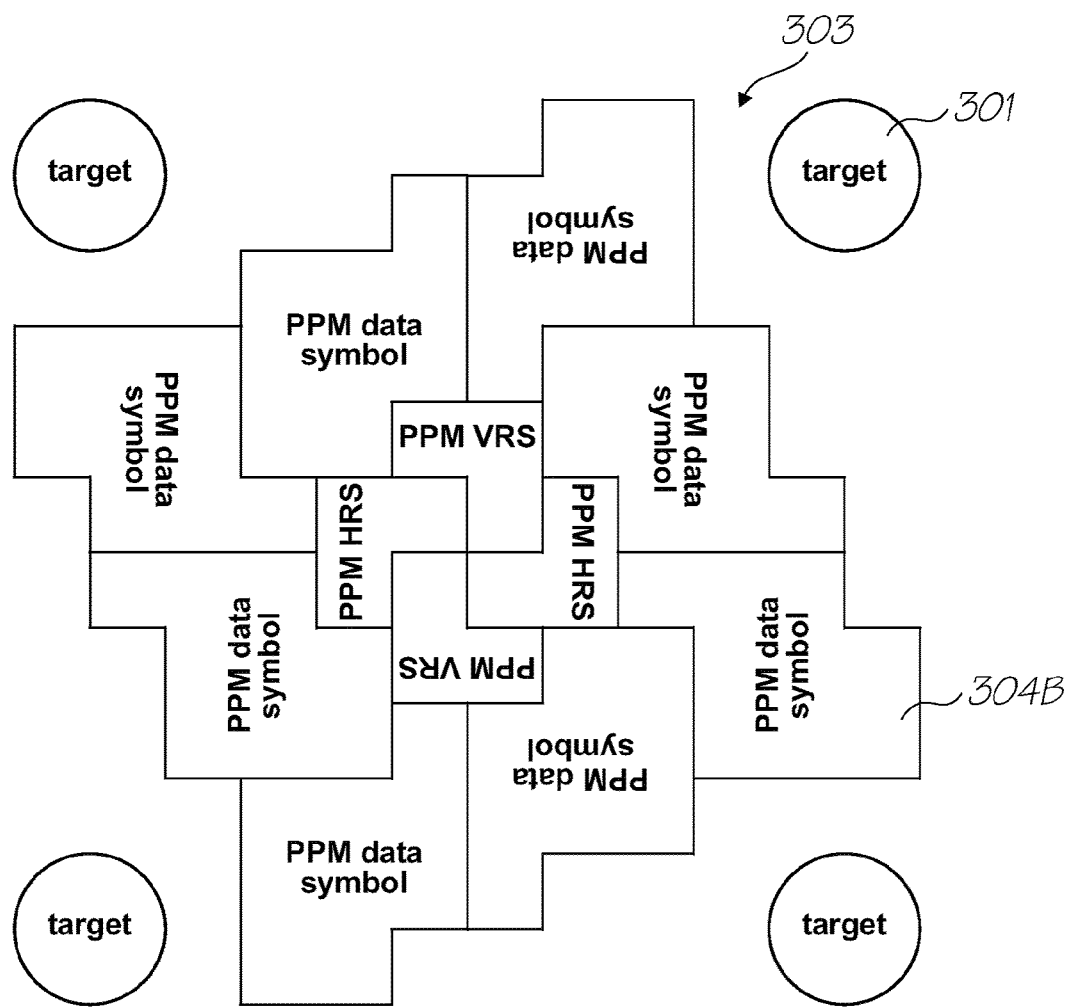
FIG. 15 shows a group of eight data symbols and four targets for the second position-coding pattern.

In common with the first position-coding pattern, each tag 4B of the second position-coding pattern is represented by two kinds of elements. Referring to FIGS. 14 and 15, the first kind of element is a target element. Target elements in the form of target dots 301 allow the tag 4B to be located in an image of a coded surface, and allow the perspective distortion of the tag to be inferred. The second kind of element is a data element in the form of a macrodot 302 (see FIG. 6). The macrodots 302 encode data values.

FIG. 14 shows the structure of a complete tag 4B from the second position-coding pattern, with target elements 301 shown. The tag 4B is square and contains nine target elements. Those target elements 301 located at the edges and corners of the tag (eight in total) are shared by adjacent tags and define the perimeter of the tag 4B.

The tag 4B consists of a square array of four symbol groups 303. Symbol groups 303 are demarcated by the target elements 301 so that each symbol group is contained within a square defined by four target elements. Adjacent symbol groups 303 are contiguous and share targets.

Since the target elements 301 are all identical, they do not demarcate one tag from its adjacent tags. Viewed purely at the level of target elements, only symbol groups 303, which define cells of a target grid, can be distinguished—the tags 4B themselves are indistinguishable by viewing only the target elements. Hence, tags 4B must be aligned with the target grid as part of tag decoding.

The tag 4B is designed to allow all tag data to be recovered from an imaging field of view substantially the size of the tag.

4.3 Symbol Groups

As shown in FIG. 15, each of the nine symbol groups 303 comprises eight data symbols 304B, each data symbol being part of a codeword. In addition, each symbol group 303 comprises a pair of registration symbols—a vertical registration symbol ('VRS') and a horizontal registration symbol ('HRS'). These allow the orientation and/or translation of the tag 4B in the field of view to be determined.

Each data symbol 304B is a multi-pulse position modulated (PPM) data symbol. Typically, each PPM data symbol 304B encodes 5-bits using 2-9 PPM encoding. i.e. 2 macrodots in any of 9 positions $\{p_0, p_1, p_2, p_3, p_4, p_5, p_6, p_7, p_8\}$.

Figure 16:
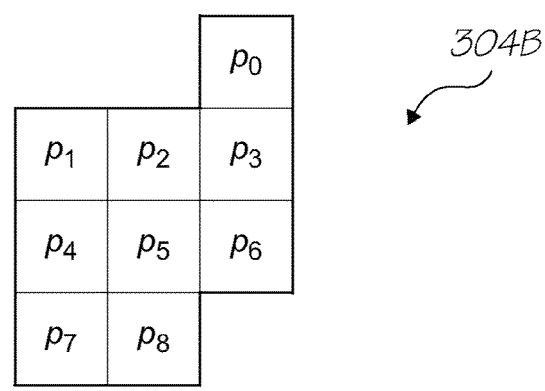
FIG. 16 shows the layout of a 2-9 PPM data symbol for the second position-coding pattern.

FIG. 16 shows the layout for a 2-9 PPM data symbol 304B.

Each symbol group also contains a 2-6 PPM vertical registration symbol (VRS) and a 2-6 PPM horizontal registration symbol (HRS), as described in Sections 3.3 and 3.6.1 above.

Table 10 defines the mapping from 2-6 PPM symbol values to data symbol values. Unused symbol values can be treated as erasures.

TABLE 10

2-9PPM symbol to data symbol value mapping

| 2-9PPM symbol value $(p_8-p_0)$ | data symbol value (base 16) |
|---|---|
| 000, 000, 011 | 0 |
| 000, 000, 101 | 1 |
| 000, 000, 110 | 2 |

TABLE 10-continued

2-9PPM symbol to data symbol value mapping

| 2-9PPM symbol value ($p_8$-$p_0$) | data symbol value (base 16) |
|---|---|
| 000, 001, 001 | 3 |
| 000, 001, 010 | 4 |
| 000, 001, 100 | 5 |
| 000, 010, 001 | 6 |
| 000, 010, 010 | 7 |
| 000, 010, 100 | 8 |
| 000, 011, 000 | 9 |
| 000, 100, 001 | a |
| 000, 100, 010 | b |
| 000, 100, 100 | c |
| 000, 101, 000 | d |
| 000, 110, 000 | e |
| 001, 000, 001 | f |
| 001, 000, 010 | 10 |
| 001, 000, 100 | 11 |
| 001, 001, 000 | 12 |
| 001, 010, 000 | 13 |
| 001, 100, 000 | 14 |
| 010, 000, 001 | 15 |
| 010, 000, 010 | 16 |
| 010, 000, 100 | 17 |
| 010, 001, 000 | 18 |
| 010, 010, 000 | 19 |
| 010, 100, 000 | 1a |
| 011, 000, 000 | 1b |
| 100, 000, 001 | 1c |
| 100, 000, 010 | 1d |
| 100, 000, 100 | 1e |
| 100, 001, 000 | 1f |
| 100, 010, 000 | unused |
| 100, 100, 000 | unused |
| 101, 000, 000 | unused |
| 110, 000, 000 | unused |

4.4 Targets and Macrodots

The spacing of macrodots 302 in both dimensions, as shown in FIG. 6, is specified by the parameter s. In the second position-coding pattern, it has a nominal value of 159 μm, based on 10 dots printed at a pitch of 1600 dots per inch.

A macrodot 302 is nominally square with a nominal size of (5/10)s. However, it is allowed to vary in size by ±10% according to the capabilities of the device used to produce the pattern.

A target 301 is nominally circular with a nominal diameter of (15/10)s. However, it is allowed to vary in size by ±10% according to the capabilities of the device used to produce the pattern.

Each symbol group 303 has a width of 10s. Therefore, each tag 4B has a width of 20s and a length of 20s. However, it should be noted from FIG. 15 that the tag 4B is configured so that some data symbols 304 extend beyond the perimeter edge of the tag 4B by one macrodot unit (1s), and interlock with complementary data symbols from adjacent tags. This arrangement provides a tessellated pattern of data symbols 304A within the target grid. From a data acquisition standpoint, tessellation of data symbols in this way increases the effective length of each tag 4B by one macrodot unit.

The macrodot spacing, and therefore the overall scale of the tag pattern, is allowed to vary between 152 μm and 169 μm according to the capabilities of the device used to produce the pattern. Any deviation from the nominal scale is recorded in each tag (via a macrodot size ID field) to allow accurate generation of position samples.

These tolerances are independent of one another. They may be refined with reference to particular printer characteristics.

4.5 Field of View

As mentioned above, the tag 4B is designed to allow all tag data to be recovered from an imaging field of view roughly the size of the tag.

Although data which is common to a set of tags, in one or both spatial dimensions, may be decoded from fragments from adjacent tags, pulse-position modulated values are best decoded from spatially-coherent samples (i.e. from a whole symbol as opposed to partial symbols at opposite sides of the field of view), since this allows raw sample values to be compared without first being normalised. This implies that the field of view must be large enough to contain two complete copies of each such pulse-position modulated value. The tag is designed so that the maximum extent of a pulse-position modulated value is four macrodots. Making the field of view at least as large as the tag plus four macrodot units guarantees that pulse-position modulated values can be coherently sampled.

4.6 Encoded Codes and Codewords

In this section (Section 4.6), each symbol in FIGS. 17 to 20 is shown with a unique label. The label consists of an alphabetic prefix which identifies which codeword the symbol is part of, and a numeric suffix which indicates the index of the symbol within the codeword. For simplicity only data symbols 304B are shown in FIGS. 17 to 20, not registration symbols.

Although some symbol labels are shown rotated to indicate the symmetry of the layout of certain codewords, the layout of each symbol is determined by its position within a symbol group and not by the rotation of the symbol label (as described in, for example, the Applicant's US Publication No. 2006/146069).

4.6.1 Registration Symbols

Each registration symbol of the second position-coding pattern is encoded using 2-6 PPM, as described above in Section 3.6.1 and FIG. 7. Furthermore, each registration symbol of the second position-coding pattern is positioned and configured in the same way as each registration symbol of the first position-coding pattern. However, the second position-coding pattern utilizes only those registration symbol values mapping to the translation code symbol values (3, 4). This enables the registration symbol to identify the second position-coding pattern, and distinguish it from the first position-coding pattern.

In other words, if the registration symbol value maps to a translation code symbol value of 3 or 4, then the position-coding pattern is identified as the second position-coding pattern having 4 symbol groups 304B contained in one tag 4B.

In the first position-coding pattern, each row of symbol groups and each column of symbol groups encodes a two-symbol 2-ary cyclic position code. (The Applicant's cyclic position codes are described in U.S. Pat. No. 7,082,562, the contents of which is herein incorporated by reference). The code consists of the codeword (3, 4) and its cyclic shifts. For each of the two orthogonal translations, the two translation codes of an entire tag form a code with a minimum distance of 4, allowing 1 symbol error to be corrected. If additional symbols are visible within the field of view then they can be used for additional redundancy.

The two translation code symbols (3 and 4) are each mapped to a set of 2-6 PPM symbol values that are the reverses of the 2-6 PPM symbol values in the other set. Thus a 3 read upside-down (i.e. rotated 180 degrees) becomes a 4, and vice versa. This allows translation to be determined independently of rotation.

Furthermore, in the first position-codinig pattern, each 2-6 PPM symbol value and its reverse map to opposite direction code symbol values (Table 2). The vertical registration symbols of an entire tag encode 4 symbols of a vertical direction code. This has a minimum distance of 4, allowing 1 symbol error to be corrected. The horizontal registration symbols of an entire tag encode 4 symbols of a horizontal direction code. This has a minimum distance of 4, allowing 1 symbol error to be corrected. If additional symbols are visible within the field of view then they can be used for additional redundancy. Any erasures detected during decoding of a translation code can also be used during decoding of a direction code, and vice versa. Together the orthogonal direction codes allow the orientation of the tag to be determined.

The top left corner of an un-rotated tag is identified by a symbol group whose translation symbols are both zero and whose direction symbols are both zero.

Although as shown in Table 2, the 2-6 PPM registration symbol does not allow flag codes for the second position-coding pattern, it will be appreciated that a 3-6 PPM registration symbol mapping to 20 available symbol values would allow the second position-coding pattern to contain flag codes, if desired. In this case, 12 registration symbol values (3×2×2) would be used for the first position-coding pattern and 8 registration symbols value (2×2×2) would be used for the second position-coding pattern.

4.6.2 Coordinate Data

The tag 4B contains an x-coordinate codeword and a y-coordinate codeword used to encode the x and y coordinates of the tag respectively. The codewords are of a shortened $2^5$-ary (4, 2) Reed-Solomon code. The tag therefore encodes 10-bit coordinates.

Each x coordinate codeword is constant within the column of tags containing the tag. Likewise, each y coordinate codeword is constant within the row of tags containing the tag.

It should be noted that, in the second position-coding pattern, none of the coordinate symbols are replicated. Instead, all coordinate symbols are placed in either one column or one row of the tag. This arrangement saves tag space since it obviates the requirement for each tag to contain two complete replications of each x-coordinate codeword and each y-coordinate codeword. Since the field of view is at least four macrodot units larger than the length of the tag, the coordinate symbols placed in a column or row line having a width of three macrodot units are still captured when the surface is imaged. Hence, each interaction with the coded surface still provides the tag location. The instance of either coordinate codeword may consist of fragments from different tags.

Figure 17:
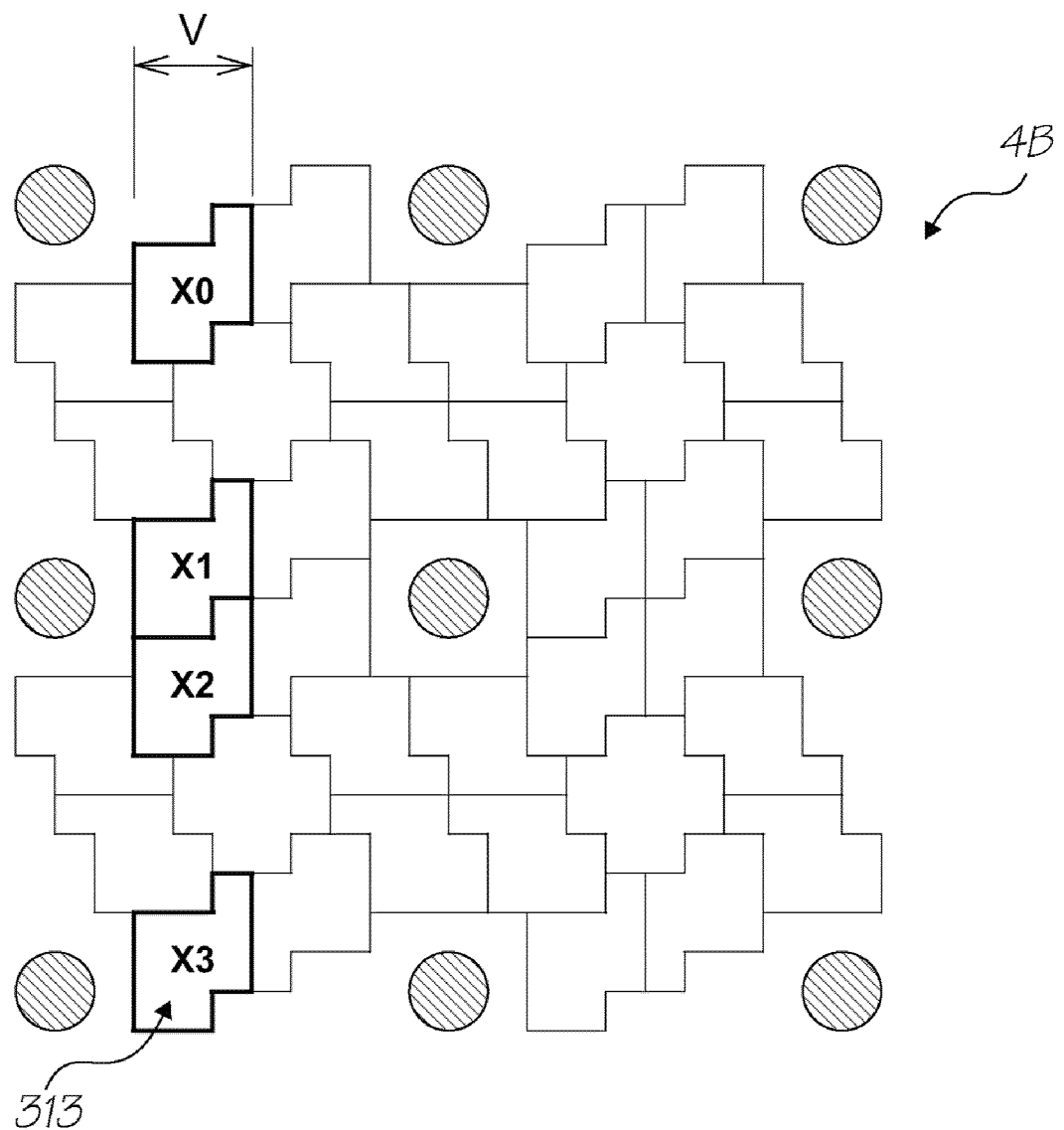
FIG. 17 shows an x-coordinate codeword X for the second position-coding pattern.
Figure 18:
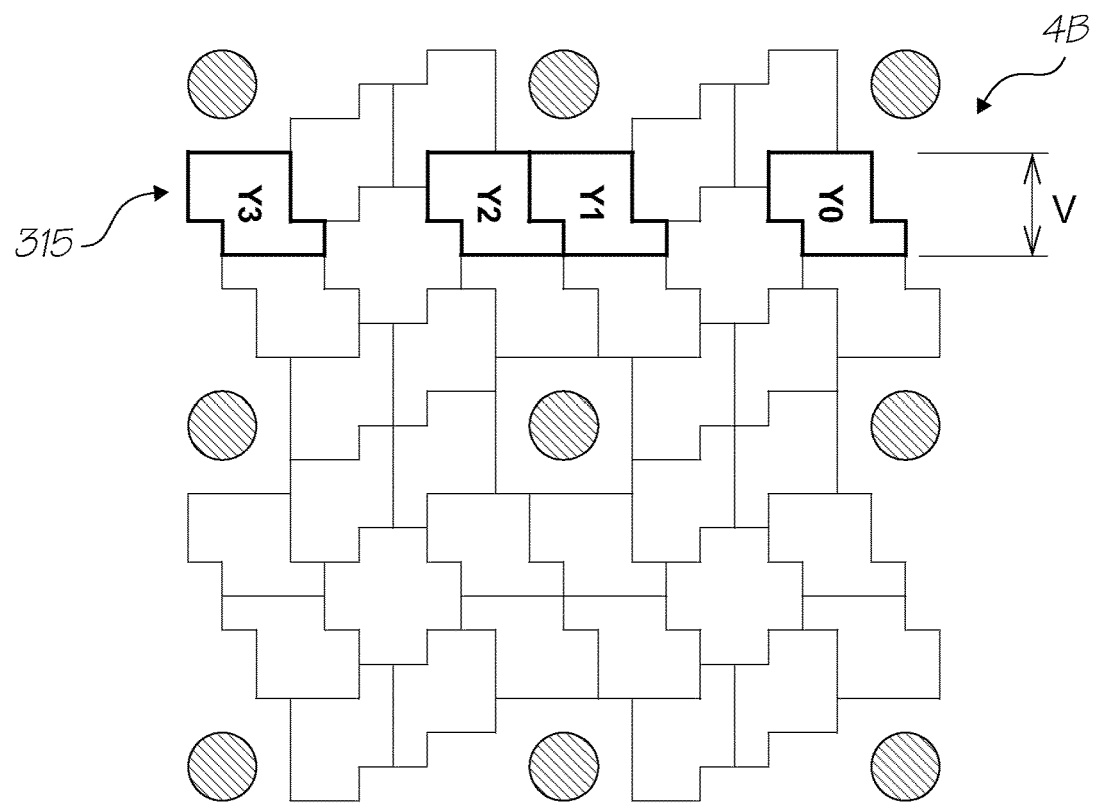
FIG. 18 shows a y-coordinate codeword Y for the second position-coding pattern.

FIG. 17 shows the layout of an x-coordinate codeword X. The outline of the codeword X is shown in bold. It should be noted that the entire x-coordinate codeword is encoded by data symbols X0, X1, X2 and X3 contained in a single column 313 of width v. Likewise, as shown in FIG. 18, the entire y-coordinate codeword is encoded by data symbols Y0, Y1, Y2 and Y3 contained in a single row 315 of width v.

The column of x-coordinate symbols and the row of y-coordinate symbols each have a width v, which corresponds to a width of 3s, where s is the macrodot spacing. Provided that an imaged portion of the second position-coding pattern contains a square of length (l+v), where l is the length of the tag, then the imaged portion is guaranteed to contain the x-coordinate codeword and the y-coordinate codeword.

4.6.3 Common Data

The tag 4B contains one codeword A which encodes information common to a set of contiguous tags in a surface region. The A codeword is of a shortened $2^5$-ary (24, 16) Reed-Solomon code. The tag 4B therefore encodes 80 bits of information common to a set of contiguous tags.

The common codeword is replicated throughout a tagged region. This guarantees that an image of the tag pattern large enough to contain a complete tag is guaranteed to contain a complete instance of the common codeword, irrespective of the alignment of the image with the tag pattern. The instance of the common codeword may consist of fragments from different tags.

Figure 19:
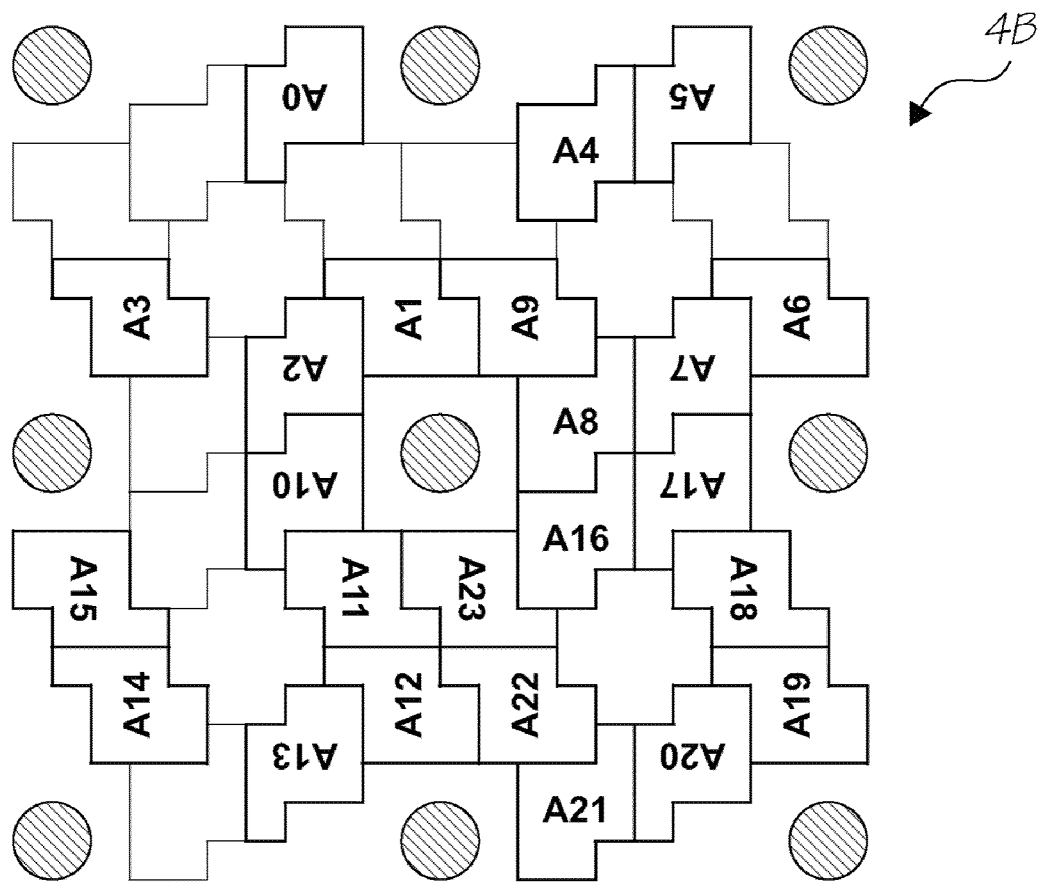
FIG. 19 shows a common codeword A for the second position-coding pattern.

The layout of the common codeword is shown in FIG. 19.

4.6.3 Complete Tag

Figure 20:
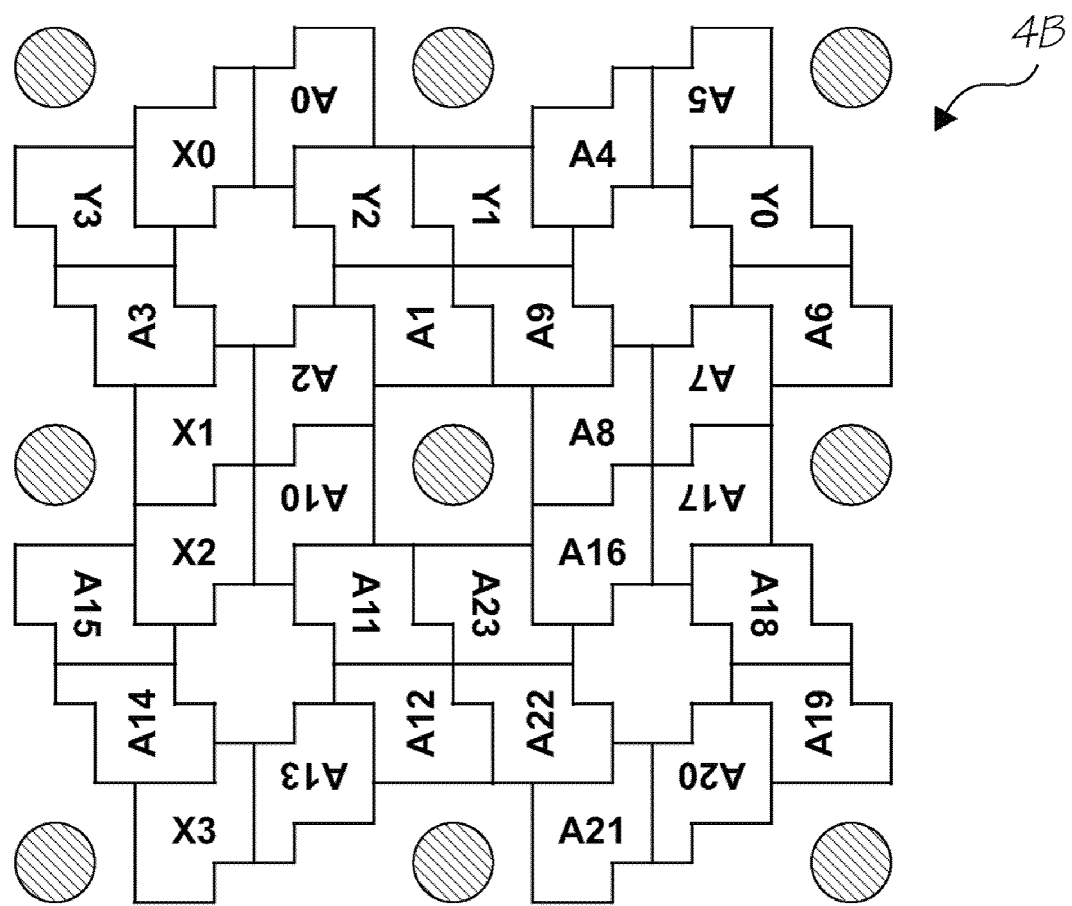
FIG. 20 shows the layout of a complete tag for the second position-coding pattern.

FIG. 20 shows the layout of the data of a complete tag 4B, with each symbol group comprising eight data symbols. The vertical and horizontal registration symbols are not shown in FIG. 20.

4.7 Reed-Solomon Encoding 4.7.1 Reed-Solomon Codes

All data of the second position-coding pattern is encoded using a Reed-Solomon code defined over $GF(2^5)$. The code has a natural length n of 31. The dimension k of the code is chosen to balance the error correcting capacity and data capacity of the code, which are $(n-k)/2$ and k symbols respectively.

The code may be punctured, by removing high-order redundancy symbols, to obtain a code with reduced length and reduced error correcting capacity. The code may also be shortened, by replacing high-order data symbols with zeros, to obtain a code with reduced length and reduced data capacity. Both puncturing and shortening can be used to obtain a code with particular parameters. Shortening is preferred, where possible, since this avoids the need for erasure decoding.

The code has the following primitive polynominal:

$$p(x)=x^5+x^2+1$$

The code has the following generator polynominal:

$$g(x) = \prod_{i=1}^{n-k} (x+)$$

For a detailed description of Reed-Solomon codes, refer to Wicker, S. B. and V. K. Bhargava, eds., *Reed-Solomon Codes and Their Applications*, IEEE Press, 1994.

4.7.2 Codeword Organization

Figure 21:
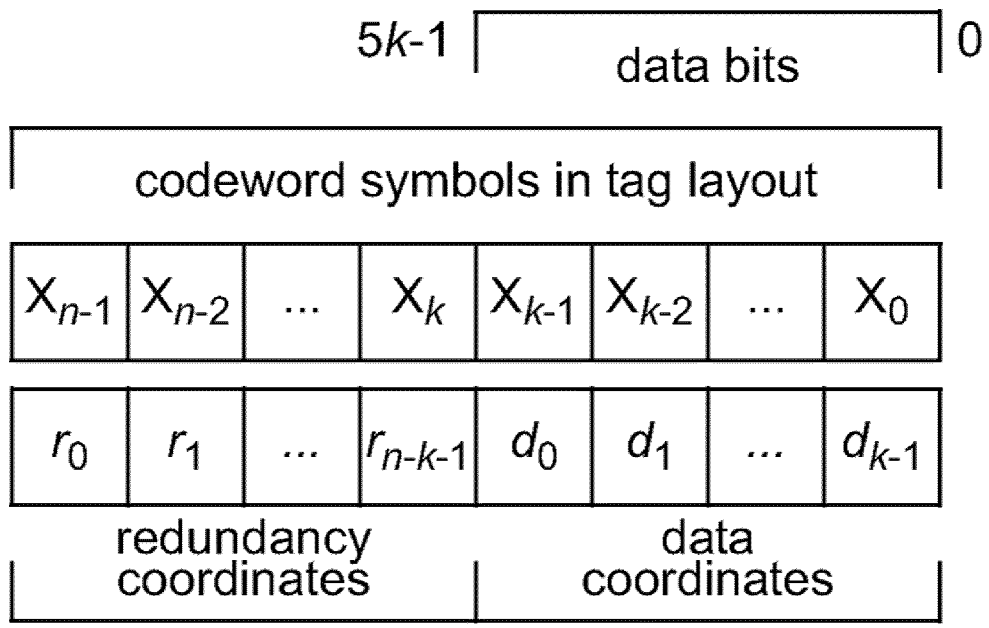
FIG. 21 shows the layout of a Reed-Solomon codeword for the second position-coding pattern.

As shown in FIG. 21, redundancy coordinates $r_i$ and data coordinates $d_i$ of the code are indexed from left to right according to the power of their corresponding polynomial terms. The symbols $X_i$ of a complete codeword are indexed from right to left to match the bit order of the data. The bit order within each symbol is the same as the overall bit order.

4.7.3 Code Instances

Table 11 defines the parameters of the different codes used in the tag 4B.

TABLE 11

Codeword instances

| name | description | length (n) | dimension (k) | error-correcting capacity (symbols) | data capacity[a] (bits) |
|---|---|---|---|---|---|
| X, Y | coordinate codewords (see Section 4.6.3) | 4[a] | 2 | 1 | 10 |
| A | first common codeword | 24[a] | 16 | 8 | 80 |

[a]shortened

4.7.4 Cyclic Redundancy Check

The region ID is protected by a 16-bit cyclic redundancy check (CRC). This provides an added layer of error detection after Reed-Solomon error correction, in case a codeword containing a part of the region ID is mis-corrected.

The CRC has the following generator polynomial:

$$g(x) = x^{16} + x^{12} + x^5 + 1$$

The CRC is initialised to 0xFFFF. The most significant bit of the region ID is treated as the most significant coefficient of the data polynomial.

4.8 Tag Coordinate Space

The tags 4B of the second position-coding pattern use a coordinate space corresponding to the first position-coding pattern having two orthogonal axes labelled x and y respectively. For a further discussion, see Section 3.8 above.

4.9 Tag Information Content

4.9.1 Field Definitions

Table 12 defines the information fields embedded in the second position-coding pattern.

TABLE 12

Field Definitions

| field | width (bits) | description |
|---|---|---|
| unique to tag | | |
| x coordinate | 10 | The unsigned x coordinate of the tag[a]. |
| y coordinate | 10 | The unsigned y coordinate of the tag[a]. |
| common to tagged region | | |
| encoding format | 2 | The format of the encoding. 0: the present encoding. Other values are reserved |
| region flags | 6 | Flags controlling the interpretation of region data (see Table 13). |
| macrodot size ID | 4 | The ID of the macrodot size. |
| region ID | 52 | The ID of the region containing the tags. |
| CRC | 16 | A CRC of the region ID (see Section 4.7.4) |

[a]allows a coordinate value ranges of 3.1 m for the minimum tag size of 3.04 mm (based on the minimum macrodot size of 152 microns and 20 macrodots per tag)

TABLE 13

Region flags

| bit | meaning |
|---|---|
| 0 | Region is interactive, i.e. x and y-coordinates are present. |
| 1 | Region is active, i.e. the entire region is an active area. |
| 2 | Region ID is serialized |
| 3 | Region is displaced according to region ID |
| other | Reserved for future use. |

4.9.2 Mapping of Fields to Codewords

Tables 14 and 15 define how the information fields map to codewords in the second position-coding pattern.

TABLE 14

Mapping of fields to coordinate codewords X and Y

| codeword | field | X and Y codeword data capacity | field width | field bits | codeword bits |
|---|---|---|---|---|---|
| X | x coordinate | 10 | | all | all |
| Y | y coordinate | 10 | | all | all |

TABLE 15

Mapping of fields to common codewords A, B, C and D

| codeword | field | field width | field bits | codeword bits |
|---|---|---|---|---|
| A | CRC | 16 | all | 15:0 |
| | region ID | 52 | all | 67:16 |
| | encoding format | 2 | all | 69:68 |
| | region flags | 6 | all | 75:70 |
| | macrodot size ID | 4 | all | 79:76 |

When the region flags indicate that a particular codeword is absent then the codeword is not coded in the tag pattern, i.e. there are no macrodots representing the codeword. This applies to the X and Y i.e. the X and Y codewords are present if the <region is interactive> flag in the region flags is set.

4.10 Tag Imaging

The minimum imaging field of view required to guarantee acquisition of data from an entire tag 4B has a diameter of 33.9s (i.e. $((2 \times 10) + 4)\sqrt{2}s$), allowing for arbitrary rotation and translation of the surface coding in the field of view. Notably, the imaging field of view does not have to be large enough to guarantee capture of an entire tag—the arrangement of the data symbols within each tag ensures that a any square portion of length (l+4s) captures the requisite information in full, irrespective of whether a whole tag is actually visible in the field-of-view. As used herein, l is defined as the length of a tag.

In terms of imaging the coding pattern, the imaging field-of-view is typically a circle. Accordingly, the imaging field-of-view should preferably have diameter of at least $(l+4s)\sqrt{2}$ and less than two tag diameters. Importantly, the field-of-view is not required to be at least two tag diameters, in contrast with prior art tag designs, because it is not essential to capture an entire tag 4B in the field of view.

The extra four macrodot units ensure that pulse-position modulated values can be decoded from spatially coherent samples. Furthermore, the extra four macrodot units ensure that all requisite data symbols 304B can be read with each interaction. These include the coordinate symbols from a column or row of a tag (see Section 4.6.2) having a width of 3s.

In the present context, a "tag diameter" is given to mean the length of a tag diagonal.

Given a maximum macrodot spacing of 169 microns, this gives a required field of view of 5.74 mm.

Thus, a field of view of at least 5.93 mm (see Section 3.10) is sufficient to capture data from an entire tag 4A from the first position-coding pattern or an entire tag 4B from the second position-coding pattern. Self-evidently, the requisite field of view for capturing either tag 4A or tag 4B will vary depending on the macrodot spacing in either the first or second position coding patterns. This, in turn, depends on the print resolution of a printer used to print the respective position-coding pattern.

4.11 Tag Decoding

Figure 22:
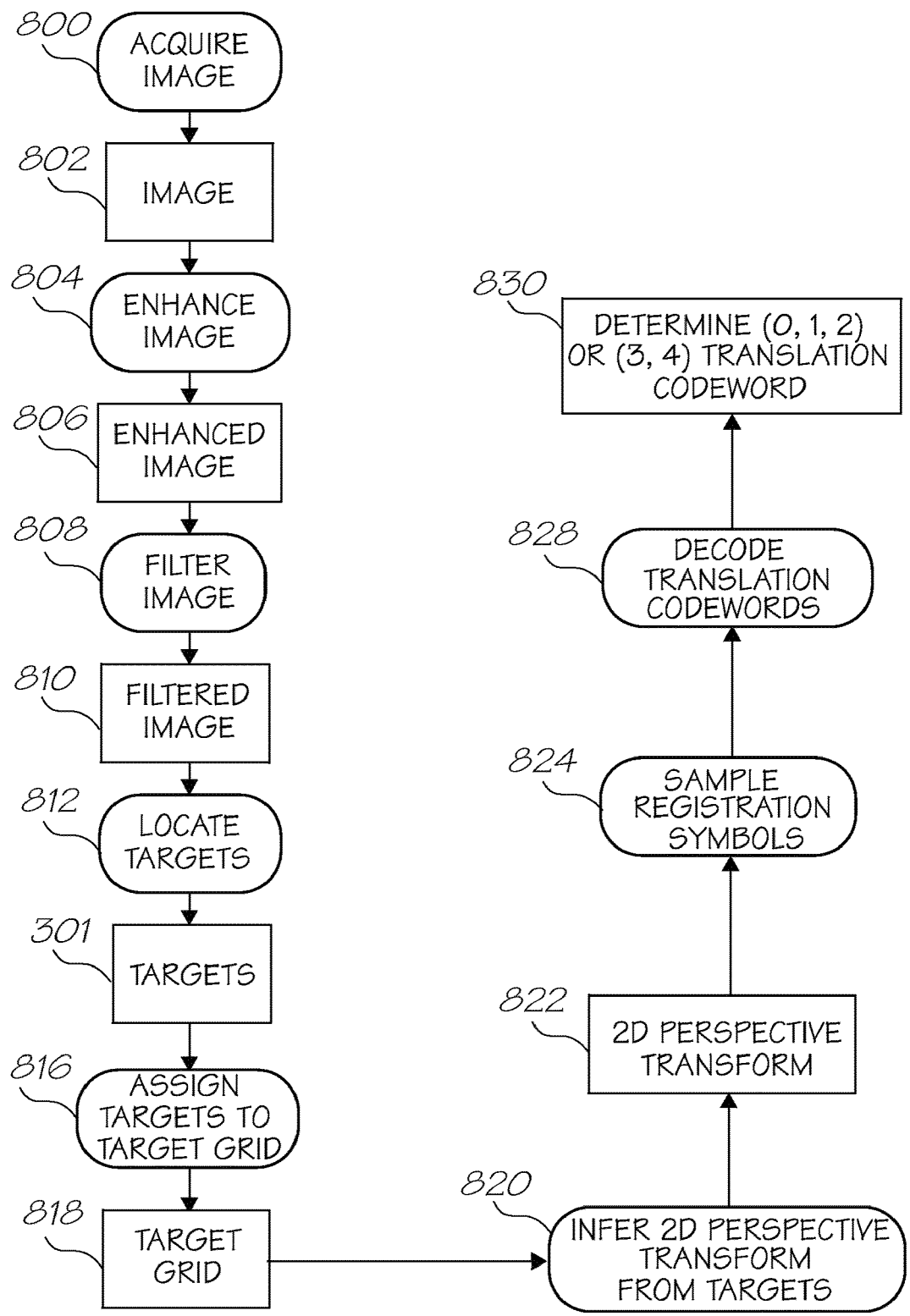
FIG. 22 is a flowchart of initial image processing by the Netpage pen.

FIG. 22 shows a tag image processing and decoding process flow up to the stage of sampling registration symbols and decoding the translation codewords. Firstly, a raw image 802 of the tag pattern is acquired (at 800), for example via an image sensor such as a CCD image 20 sensor, CMOS image sensor, or a scanning laser and photodiode image sensor. The raw image 802 is then typically enhanced (at 804) to produce an enhanced image 806 with improved contrast and more uniform pixel intensities. Image enhancement may include global or local range expansion, equalization, and the like. The enhanced image 806 is then typically filtered (at 808) to produce a filtered image 810. Image filtering may consist of low-pass filtering, with the low-pass filter kernel size tuned to obscure macrodots 302 but to preserve targets 301. The filtering step 808 may include additional filtering (such as edge detection) to enhance target features 301. Encoding of data symbols 304 using pulse position modulation (PPM) provides a more uniform coding pattern 3 than simple binary dot encoding (as described in, for example, U.S. Pat. No. 6,832,717). Advantageously, this helps separate targets 301 from data areas, thereby allowing more effective low-pass filtering of the PPM-encoded data compared to binary-coded data.

Following low-pass filtering, the filtered image 810 is then processed (at 812) to locate the targets 301. This may consist of a search for target features whose spatial inter-relationship is consistent with the known geometry of the tag pattern (i.e. targets positioned at the corners of square cells). Candidate targets may be identified directly from maxima in the filtered image 810, or may be the subject of further characterization and matching, such as via their (binary or grayscale) shape moments (typically computed from pixels in the enhanced image 806 based on local maxima in the filtered image 810), as described in U.S. Pat. No. 7,055,739, the contents of which is herein incorporated by reference.

The identified targets 301 are then assigned (at 816) to a target grid 818. Each cell of the grid 818 contains a symbol group 303, and several symbol groups will of course be visible in the image. At this stage, individual tags 4 will not be identifiable in the target grid 818, since the targets 301 do not themselves demarcate one tag from another.

To allow macrodot values to be sampled accurately, the perspective transform of the captured image must be inferred. Four of the targets 301 are taken to be the perspective-distorted corners of a square of known size in tag space, and the eight-degree-of-freedom perspective transform 822 is inferred (at 820), based on solving the well-understood equations relating the four tag-space and image-space point pairs. Calculation of the 2D perspective transform is described in detail in, for example, Applicant's U.S. Pat. No. 6,832,717, the contents of which is herein incorporated by reference.

Since each image of either the first or second position-coding pattern will typically contain at least 9 targets arranged in a square grid, the accuracy of calculating the 2D perspective transform is improved compared to the Applicant's previous tag designs described in, for example, U.S. Pat. No. 6,832,717. Hence, more accurate position calculation can be achieved with the tag design of the present invention.

The inferred tag-space to image-space perspective transform 822 is used to project each known macrodot position in tag space into image space. Since all bits in the tags are represented by PPM-encoding, the presence or absence of each macrodot 302 can be determined using a local intensity reference, rather than a separate intensity reference. Thus, PPM-encoding provides improved data sampling compared with pure binary encoding.

The next stage determines a type of position-coding pattern being imaged by the pen 400 from a translation codeword. In other words, this stage distinguishes the first position-coding pattern from the second position-coding pattern for subsequent sampling and decoding.

Two or more orthogonal registration symbols ('VRS' and 'HRS') are sampled (at 824), to allow decoding of the orthogonal translation codewords and the orthogonal direction codewords. A flag symbol value may also be decoded subsequently from the decoded registration symbols.

Decoding of the orthogonal translation codewords (at 828) yields either a (0, 1, 2) translation codeword or a (3, 4) translation codeword (at 830).

Figure 23:
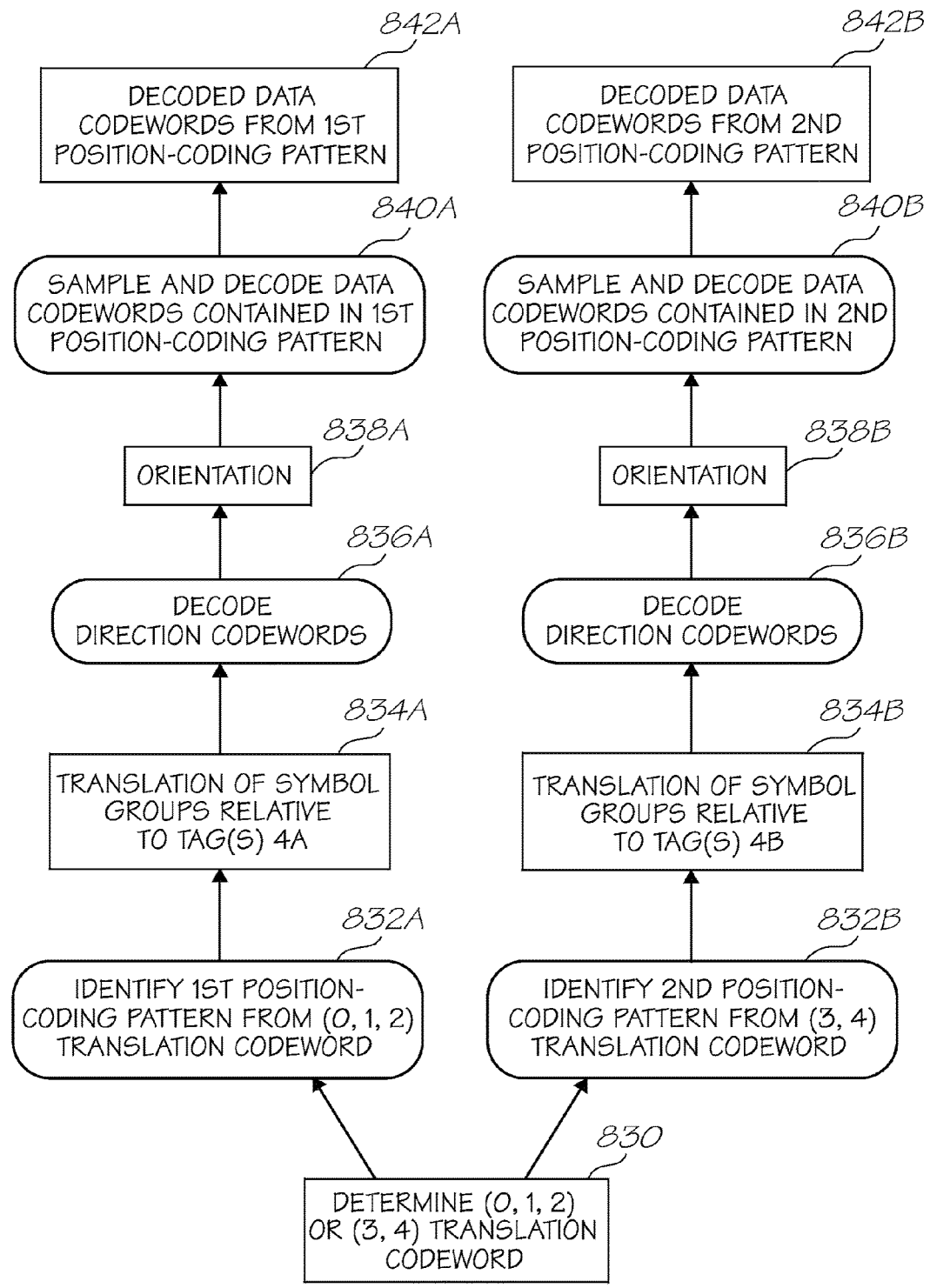
FIG. 23 is a flowchart of codeword decoding subsequent to the initial image processing.

Referring now to FIG. 23, the (0, 1, 2) translation codeword indicates nine symbol groups per tag, thereby identifying (at 832A) the imaged position-coding pattern as being the first position-coding pattern ("Yarrow") containing tags 4A. Alternatively, the (3, 4) translation codeword indicates four symbol groups per tag, thereby identifying (at 832B) the imaged position-coding pattern as being the second position-coding pattern ("Saffron") containing tags 4B.

Once the position-coding pattern has been identified at 832A or 832B, subsequent sampling and decoding proceeds in accordance with the position-coding pattern thus identified. Accordingly, the decoded orthogonal translation codewords are used to determine the translation of tags(s) in the field of view relative to the target grid 818. This enables alignment of the tags 4A or 4B with the target grid 818, thereby allowing individual tag(s), or portions thereof, to be distinguished in the coding pattern 3 in the field of view. In the case of the first position-coding pattern, the tags 4A (each containing nine symbol groups) are aligned (at 834A) with the target grid 818. In the case of the second position-coding pattern, the tags 4B (each containing four symbol groups) are aligned (at 834B) with the target grid 818.

Since each symbol group 303 contains orthogonal registration symbols, multiple translation codes can be decoded to provide robust translation determination. As described in Sections 3.6.1 and 4.6.1, the translation code is a cyclic position code. Since each row and each column of a tag contains M symbol groups, the code has minimum distance M×M. This allows robust determination of the alignment of tags 4A or 4B with the target grid 818. The alignment needs to be both robust and accurate since there are many possible alignments when each tag contains multiple symbol groups 303.

After the translation of symbol groups 303 relative to tags 4A or 4B has been determined, then at least two orthogonal direction codes are decoded (at 836A or 836B) to provide the orientation 838A or 838B. As described in Sections 3.6.1 and 4.6.1, since N vertical registration symbols in a tag form a vertical direction code with minimum distance N, the vertical direction code is capable of correcting $(N-1)/2$ errors. The horizontal direction code is similarly capable of correcting $(N-1)/2$ errors using N horizontal registration symbols.

Hence, orientation determination is very robust and capable of correcting errors, depending on the number of registration symbols sampled.

Once initial imaging and decoding has yielded the 2D perspective transform, the orientation, and the translation of tag(s) relative to the target grid, the data codewords can then be sampled and decoded (at 840A or 840B) to yield the requisite decoded codewords 842A or 842B.

Decoding of data codewords in the first position-coding pattern ("Yarrow") typically proceeds as follows:
- sample and decode Reed-Solomon codeword containing encoding format etc. (A)
- determine encoding format, and reject unknown encoding on decode error flag bad region ID sample
- determine region ID Reed-Solomon codeword format from region flags
- sample and decode Reed-Solomon codeword containing region ID (B, C and D)
- verify CRC of region ID
- on decode error flag bad region ID sample
- determine region ID
- determine x and y coordinate Reed-Solomon codeword format from region flags
- sample and decode x and y coordinate Reed-Solomon codewords (X and Y)
- determine tag x-y location from codewords
- determine nib x-y location from tag x-y location and perspective transform taking into account macrodot size (from macrodot size ID)
- decode four or more flag symbols to determine active area flag
- determine active area status of nib location with reference to active area flag
- encode region ID, nib x-y location, and nib active area status in digital ink ("interaction data")

Decoding of data codewords in the second position-coding pattern ("Saffron") typically proceeds as follows:
- sample and decode common Reed-Solomon codeword (A)
- determine encoding format, and reject unknown encoding on decode error flag bad format sample
- determine region ID Reed-Solomon codeword format from region flags
- verify CRC of region ID
- on decode error flag bad region ID sample
- determine region ID
- sample and decode x and y coordinate Reed-Solomon codewords (X and Y)
- determine tag x-y location from codewords
- determine nib x-y location from tag x-y location and perspective transform taking into account macrodot size (from macrodot size ID)
- encode region ID and nib x-y location in digital ink ("interaction data")

In practice, when decoding a sequence of images of a tag pattern, it is useful to exploit inter-frame coherence to obtain greater effective redundancy.

Region ID decoding need not occur at the same rate as position decoding.

The skilled person will appreciate that the decoding sequence described above represents one embodiment of the present invention. It will, of course, be appreciated that the interaction data sent from the pen 400 to the netpage system may include other data e.g. digital signature (see Section 3.9.4), pen mode (see US 2007/125860 incorporated herein by reference), orientation data, force data, pen ID, nib ID etc.

An example of interpreting interaction data, received by the netpage system from the netpage pen 400, is discussed briefly above in Section 1. A more detailed discussion of how the netpage system may interpret interaction data can be found in the Applicant's previously-filed applications (see, for example, US 2007/130117 and US 2007/108285, the contents of which are herein incorporated by reference).

5. Netpage Pen 5.1 Functional Overview

The active sensing device (or "reader") of the netpage system may take the form of a clicker (for clicking on a specific position on a surface), a pointer having a stylus (for pointing or gesturing on a surface using pointer strokes), or a pen having a marking nib (for marking a surface with ink when pointing, gesturing or writing on the surface). For a description of various netpage readers, reference is made to U.S. Pat. No. 7,105,753; U.S. Pat. No. 7,015,901; U.S. Pat. No. 7,091,960; and US Publication No. 2006/0028459, the contents of each of which are herein incorporated by reference.

It will be appreciated that the present invention may utilize any suitable optical reader. However, the Netpage pen 400 will be described herein as one such example.

In accordance with the present invention, either the first position-coding pattern (as described in Section 3) or the second position-coding pattern (as described in Section 4) may be read using the same Netpage pen 400 using the image processing and decoding steps described in Section 4.11.

The Netpage pen 400 is a motion-sensing writing instrument which works in conjunction with a tagged Netpage surface containing either the first or second position-coding patterns. The pen 400 incorporates a conventional ballpoint pen cartridge for marking the surface, an image sensor and processor for simultaneously capturing the absolute path of the pen on the surface and identifying the surface, a force sensor for simultaneously measuring the force exerted on the nib, and a real-time clock for simultaneously measuring the passage of time.

While in contact with a tagged surface, as indicated by the force sensor, the pen continuously images the surface region adjacent to the nib, and decodes the nearest tag in its field of view to determine both the identity of the surface, its own instantaneous position on the surface and the pose of the pen. The pen thus generates a stream of timestamped position samples relative to a particular surface, and transmits this stream to the Netpage server 10. The sample stream describes a series of strokes, and is conventionally referred to as digital ink (DInk). Each stroke is delimited by a pen down and a pen up event, as detected by the force sensor. More generally, any data resulting from an interaction with a Netpage, and transmitted to the Netpage server 10, is referred to herein as "interaction data".

The pen samples its position at a sufficiently high rate (nominally 100 Hz) to allow a Netpage server to accurately reproduce hand-drawn strokes, recognise handwritten text, and verify hand-written signatures.

The Netpage pen also supports hover mode in interactive applications. In hover mode the pen is not in contact with the paper and may be some small distance above the surface of the paper (or other substrate). This allows the position of the pen, including its height and pose to be reported. In the case of an interactive application the hover mode behaviour can be used to move a cursor without marking the paper, or the distance of the nib from the coded surface could be used for tool behaviour control, for example an air brush function.

The pen includes a Bluetooth radio transceiver for transmitting digital ink via a relay device to a Netpage server. When operating offline from a Netpage server the pen buffers captured digital ink in non-volatile memory. When operating online to a Netpage server the pen transmits digital ink in real time.

The pen is supplied with a docking cradle or "pod". The pod contains a Bluetooth to USB relay. The pod is connected via a USB cable to a computer which provides communications support for local applications and access to Netpage services.

The pen is powered by a rechargeable battery. The battery is not accessible to or replaceable by the user. Power to charge the pen can be taken from the USB connection or from an external power adapter through the pod. The pen also has a power and USB-compatible data socket to allow it to be externally connected and powered while in use.

The pen cap serves the dual purpose of protecting the nib and the imaging optics when the cap is fitted and signalling the pen to leave a power-preserving state when uncapped.

5.2 Ergonomics and Layout

Figure 24:
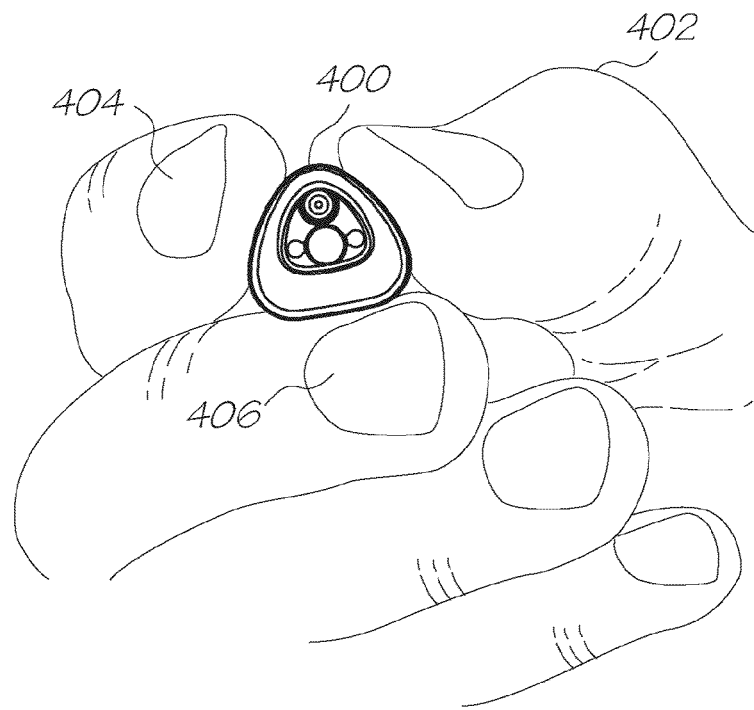
FIG. 24 shows a nib and elevation of the Netpage pen held by a user.

FIG. 24 shows a rounded triangular profile giving the pen 400 an ergonomically comfortable shape to grip and use the pen in the correct functional orientation. It is also a practical shape for accommodating the internal components. A normal pen-like grip naturally conforms to a triangular shape between thumb 402, index finger 404 and middle finger 406.

Figure 25:
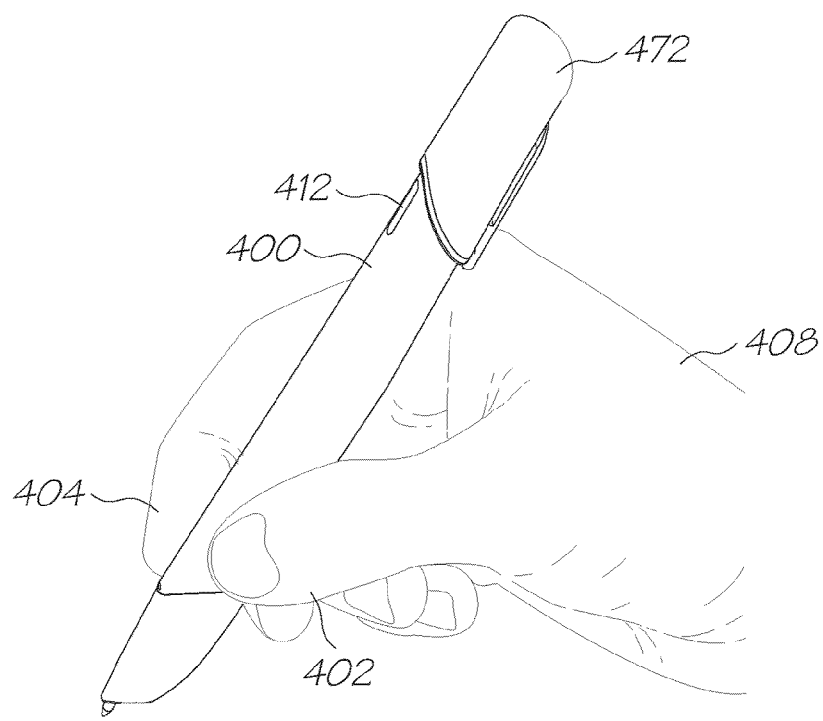
FIG. 25 shows the pen held by a user at a typical incline to a writing surface.

As shown in FIG. 25, a typical user writes with the pen 400 at a nominal pitch of about 30 degrees from the normal toward the hand 408 when held (positive angle) but seldom operates a pen at more than about 10 degrees of negative pitch (away from the hand). The range of pitch angles over which the pen 400 is able to image the pattern on the paper has been optimised for this asymmetric usage. The shape of the pen 400 helps to orient the pen correctly in the user's hand 408 and to discourage the user from using the pen "upside-down". The pen functions "upside-down" but the allowable tilt angle range is reduced.

The cap 410 is designed to fit over the top end of the pen 400, allowing it to be securely stowed while the pen is in use. Multi colour LEDs illuminate a status window 412 in the top edge (as in the apex of the rounded triangular cross section) of the pen 400 near its top end. The status window 412 remains un-obscured when the cap is stowed. A vibration motor is also included in the pen as a haptic feedback system (described in detail below).

As shown in FIG. 26, the grip portion of the pen has a hollow chassis molding 416 enclosed by a base molding 528 to house the other components. The ink cartridge 414 for the ball point nib (not shown) fits naturally into the apex 420 of the triangular cross section, placing it consistently with the user's grip. This in turn provides space for the main PCB 422 in the centre of the pen and for the battery 424 in the base of the pen. By referring to FIG. 27A, it can be seen that this also naturally places the tag-sensing optics 426 unobtrusively below the nib 418 (with respect to nominal pitch). The nib molding 428 of the pen 400 is swept back below the ink cartridge 414 to prevent contact between the nib molding 428 and the paper surface when the pen is operated at maximum pitch.

As best shown in FIG. 27B, the imaging field of view 430 emerges through a centrally positioned IR filter/window 432 below the nib 418, and two near-infrared illumination LEDs 434, 436 emerge from the two bottom corners of the nib molding 428. Each LED 434, 436 has a corresponding illumination field 438, 440.

As the pen is hand-held, it may be held at an angle that causes reflections from one of the LED's that are detrimental to the image sensor. By providing more than one LED, the LED causing the offending reflections can be extinguished.

Specific details of the pen mechanical design can be found in US Publication No. 2006/0028459, the contents of which are herein incorporated by reference.

5.3 Pen Feedback Indications

FIG. 28 is a longitudinal cross section through the centre-line if the pen 400 (with the cap 410 stowed on the end of the pen). The pen incorporates red and green LEDs 444 to indicate several states, using colours and intensity modulation. A light pipe 448 on the LEDs 444 transmit the signal to the status indicator window 412 in the tube molding 416. These signal status information to the user including power-on, battery level, untransmitted digital ink, network connection on-line, fault or error with an action, detection of an "active area" flag, detection of an "embedded data" flag, further data sampling to required to acquire embedded data, acquisition of embedded data completed etc.

A vibration motor 446 is used to haptically convey information to the user for important verification functions during transactions. This system is used for important interactive indications that might be missed due to inattention to the LED indicators 444 or high levels of ambient light. The haptic system indicates to the user when:

The pen wakes from standby mode
There is an error with an action
To acknowledge a transaction 5.4 Pen Optics The pen incorporates a fixed-focus narrowband infrared imaging system. It utilizes a camera with a short exposure time, small aperture, and bright synchronised illumination to capture sharp images unaffected by defocus blur or motion blur.

TABLE 16

Optical Specifications

| | |
|---|---|
| Magnification | ⁻0.225 |
| Focal length of lens | 6.0 mm |
| Viewing distance | 30.5 mm |
| Total track length | 41.0 mm |
| Aperture diameter | 0.8 mm |
| Depth of field | 6.5 mm |
| Exposure time | 200 us |
| Wavelength | 810 nm |
| Image sensor size | 140 × 140 pixels |
| Pixel size | 10 um |
| Pitch range | ⁻15 to. 45 deg |
| Roll range | ⁻30 to. 30 deg |
| Yaw range | 0 to 360 deg |
| Minimum sampling rate | 2.25 pixels per macrodot |
| Maximum pen velocity | 0.5 m/s |

[1]Allowing 70 micron blur radius
[2]Illumination and filter
[3]Pitch, roll and yaw are relative to the axis of the pen Cross sections showing the pen optics are provided in FIGS. 29A and 29B. An image of the Netpage tags printed on a surface 548 adjacent to the nib 418 is focused by a lens 488 onto the active region of an image sensor 490. A small aperture 494 ensures the available depth of field accommodates the required pitch and roll ranges of the pen 400.

First and second LEDs 434 and 436 brightly illuminate the surface 549 within the field of view 430. The spectral emission peak of the LEDs is matched to the spectral absorption peak of the infrared ink used to print Netpage tags to maximise contrast in captured images of tags. The brightness of the LEDs is matched to the small aperture size and short exposure time required to minimise defocus and motion blur.

A longpass IR filter 432 suppresses the response of the image sensor 490 to any coloured graphics or text spatially coincident with imaged tags and any ambient illumination below the cut-off wavelength of the filter 432. The transmission of the filter 432 is matched to the spectral absorption peak of the infrared ink to maximise contrast in captured images of tags. The filter also acts as a robust physical window, preventing contaminants from entering the optical assembly 470.

5.5 Pen Imaging System

Figure 30:
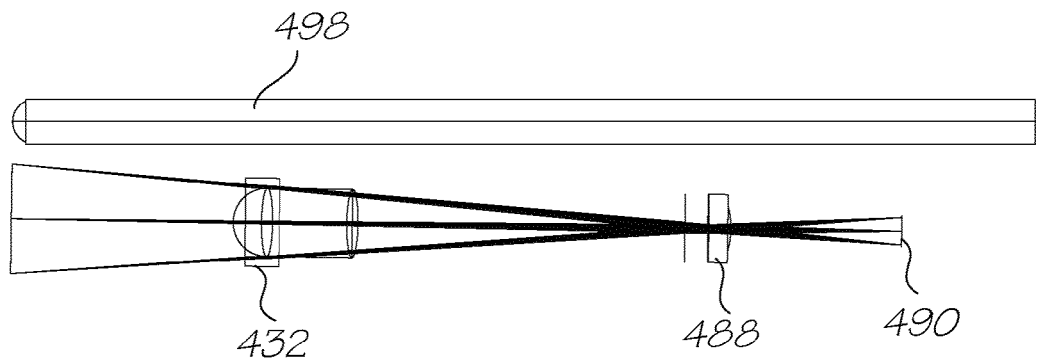
FIG. 30 is a ray trace of the pen optics adjacent a sketch of the ink cartridge.
Figure 31:
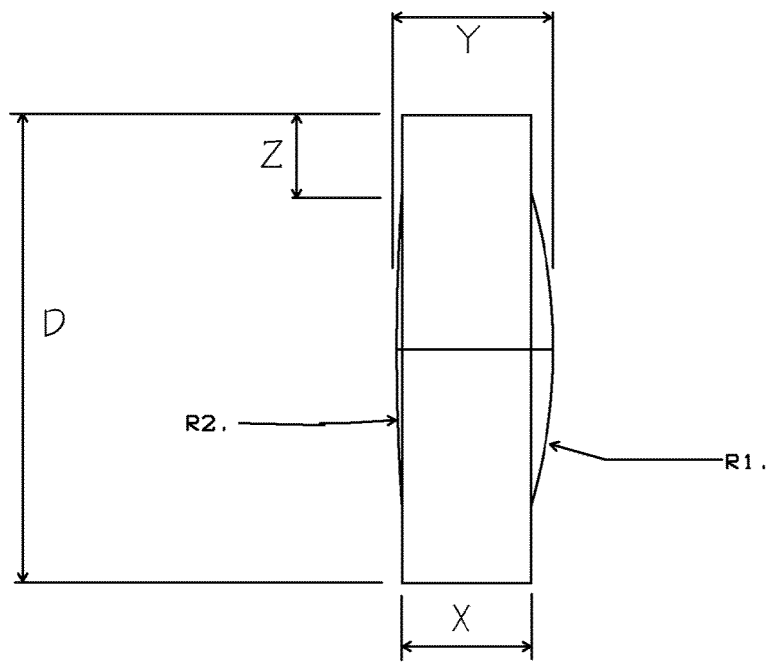
FIG. 31 is a side elevation of the lens.

A ray trace of the optic path is shown in FIG. 30. The image sensor 490 is a CMOS image sensor with an active region of 140 pixels squared. Each pixel is 10 μm squared, with a fill factor of 93%. Turning to FIG. 31, the lens 488 is shown in detail. The dimensions are:

D=3 mm
R1=3.593 mm
R2=15.0 mm
X=0.8246 mm
Y=1.0 mm
Z=0.25 mm

This gives a focal length of 6.15 mm and transfers the image from the object plane (tagged surface 548) to the image plane (image sensor 490) with the correct sampling frequency to successfully decode all images over the specified pitch, roll and yaw ranges. The lens 488 is biconvex, with the most curved surface facing the image sensor. The minimum imaging field of view 430 required to guarantee acquisition of sufficient tag data with each interaction is dependent on the specific coding pattern. The required field of view for the coding patterns of the present invention is described in Section 4.10.

The required paraxial magnification of the optical system is defined by the minimum spatial sampling frequency of 2.25 pixels per macrodot for the fully specified tilt range of the pen 400, for the image sensor 490 of 10 μm pixels. Typically, the imaging system employs a paraxial magnification of 0.225, the ratio of the diameter of the inverted image at the image sensor to the diameter of the field of view at the object plane, on an image sensor 490 of minimum 128×128 pixels. The image sensor 490 however is 140×140 pixels, in order to accommodate manufacturing tolerances. This allows up to ±120 μm (12 pixels in each direction in the plane of the image sensor) of misalignment between the optical axis and the image sensor axis without losing any of the information in the field of view.

The lens 488 is made from Poly-methyl-methacrylate (PMMA), typically used for injection moulded optical components. PMMA is scratch resistant, and has a refractive index of 1.49, with 90% transmission at 810 nm. The lens is biconvex to assist moulding precision and features a mounting surface to precisely mate the lens with the optical barrel molding 492.

A 0.8 mm diameter aperture 494 is used to provide the depth of field requirements of the design.

The specified tilt range of the pen is 15.0 to 45.0 degree pitch, with a roll range of 30.0 to 30.0 degrees. Tilting the pen through its specified range moves the tilted object plane up to 6.3 mm away from the focal plane. The specified aperture thus provides a corresponding depth of field of 6.5 mm, with an acceptable blur radius at the image sensor of 16 μm.

Due to the geometry of the pen design, the pen operates correctly over a pitch range of 33.0 to 45.0 degrees.

Figure 32:
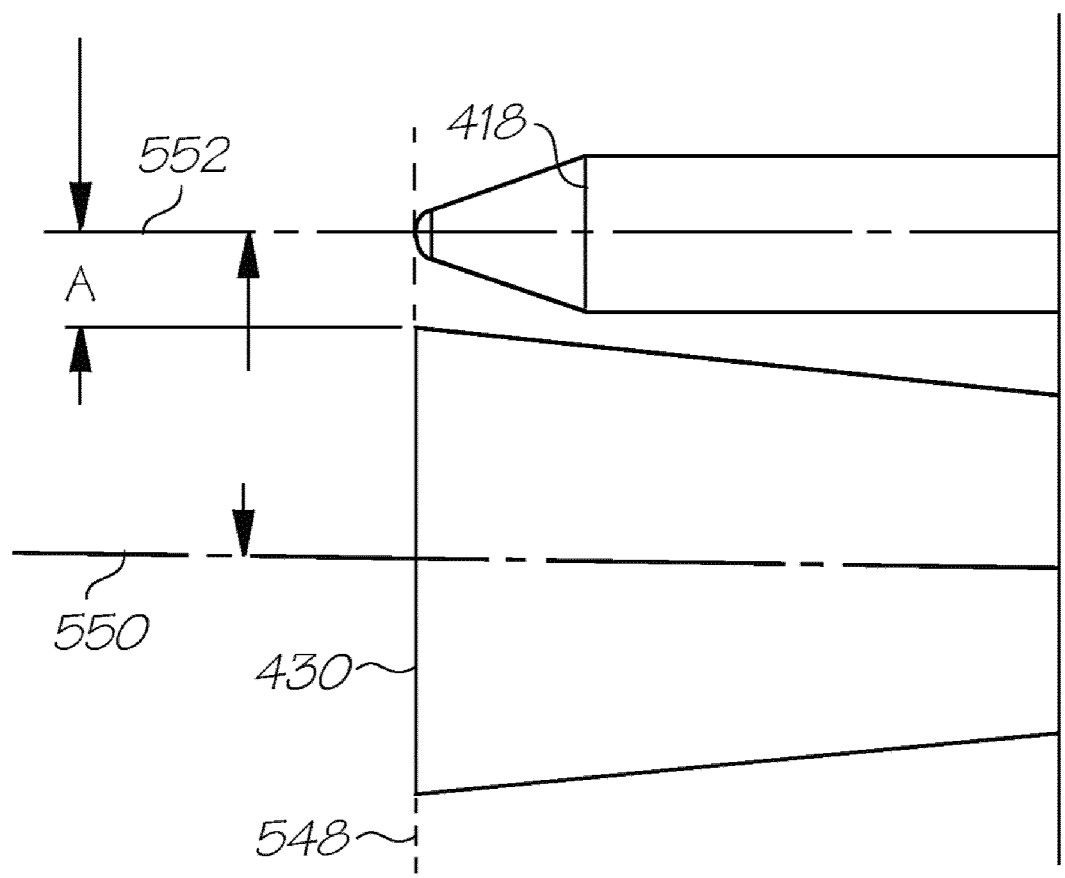
FIG. 32 is a side elevation of the nib and the field of view of the optical sensor.

Referring to FIG. 32, the optical axis 550 is pitched 0.8 degrees away from the nib axis 552. The optical axis and the nib axis converge toward the paper surface 548. With the nib axis 552 perpendicular to the paper, the distance A between the edge of the field of view 430 closest to the nib axis and the nib axis itself is 1.2 mm.

The longpass IR filter 432 is made of CR-39, a lightweight thermoset plastic heavily resistant to abrasion and chemicals such as acetone. Because of these properties, the filter also serves as a window. The filter is 1.5 mm thick, with a refractive index of 1.50. Each filter may be easily cut from a large sheet using a $CO_2$ laser cutter.

5.6 Electronics Design

TABLE 17

| Electrical Specifications | |
| --- | --- |
| Processor | ARM7 (Atmel AT91FR40162) running at 80 MHz with 256 kB SRAM and 2 MB flash memory |
| Digital ink storage capacity | 5 hours of writing |
| Bluetooth Compliance | 1.2 |
| USB Compliance | 1.1 |
| Battery standby time | 12 hours (cap off), >4 weeks (cap on) |
| Battery writing time | 4 hours of cursive writing (81% pen down, assuming easy offload of digital ink) |
| Battery charging time | 2 hours |
| Battery Life | Typically 300 charging cycles or 2 years (whichever occurs first) to 80% of initial capacity. |
| Battery Capacity/Type | ~340 mAh at 3.7 V, Lithium-ion Polymer (LiPo) |

Figure 33:
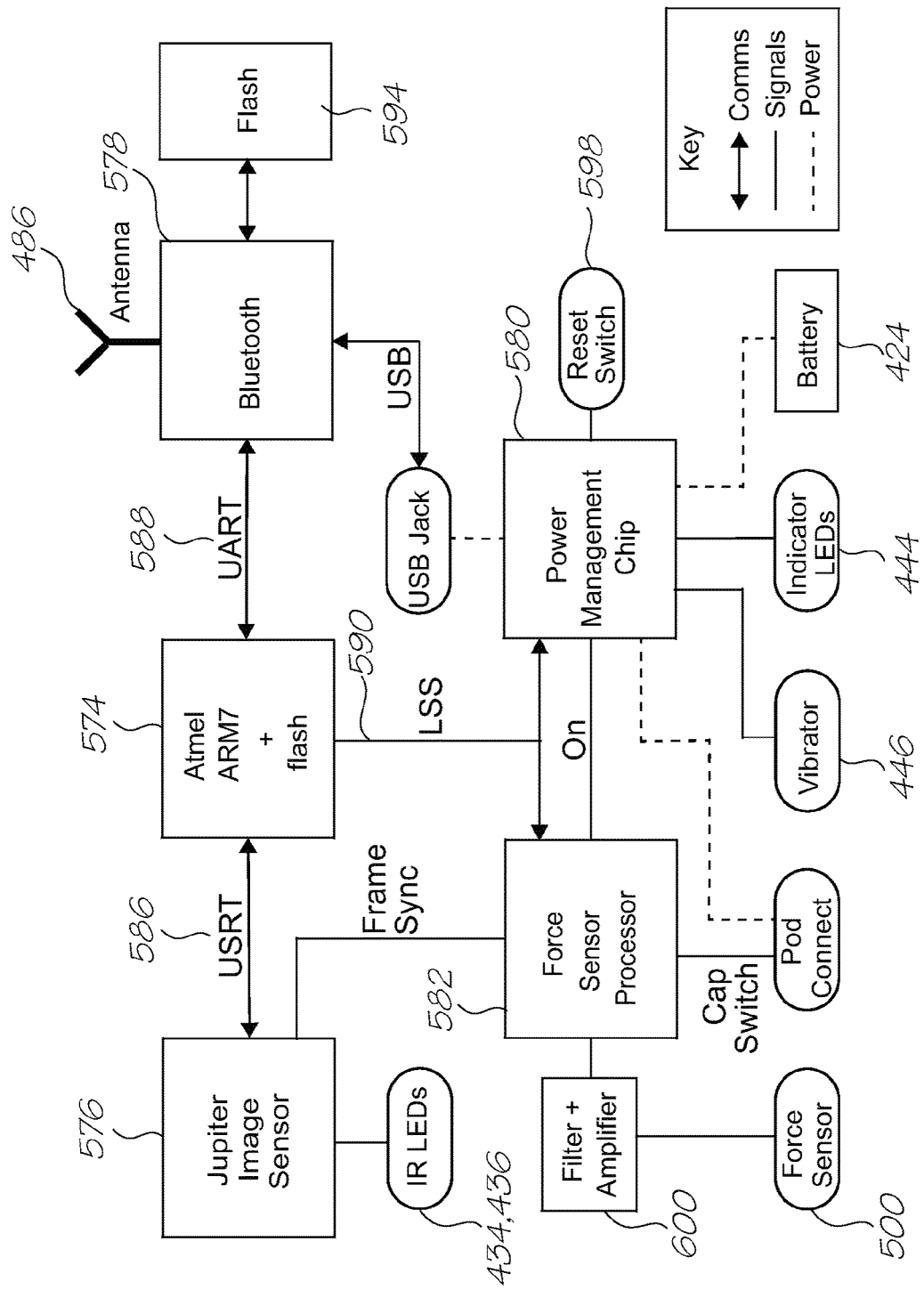
FIG. 33 is a block diagram of the pen electronics.

FIG. 33 is a block diagram of the pen electronics. The electronics design for the pen is based around five main sections. These are:

the main ARM7 microprocessor 574,
the image sensor and image processor 576,
the Bluetooth communications module 578,
the power management unit IC (PMU) 580 and
the force sensor microprocessor 582.

5.6.1 Microprocessor

The pen uses an Atmel AT91FR40162 microprocessor (see Atmel, AT91 ARM Thumb Microcontrollers—A T91FR40162 Preliminary, http://www.keil.com/dd/docs/datashts/atmel/at91fr40162.pdf) running at 80 MHz. The AT91FR40162 incorporates an ARM7 microprocessor, 256 kBytes of on-chip single wait state SRAM and 2 MBytes of external flash memory in a stack chip package.

This microprocessor 574 forms the core of the pen 400. Its duties include:

setting up the Jupiter image sensor 584,
decoding images of Netpage coding pattern (see Section 4.11), with assistance from the image processing features of the image sensor 584, for inclusion in the digital ink stream along with force sensor data received from the force sensor microprocessor 582,
setting up the power management IC (PMU) 580,
compressing and sending digital ink via the Bluetooth communications module 578, and
programming the force sensor microprocessor 582.

The ARM7 microprocessor 574 runs from an 80 MHz oscillator. It communicates with the Jupiter image sensor 576 using a Universal Synchronous Receiver Transmitter (USRT) 586 with a 40 MHz clock. The ARM7 574 communicates with the Bluetooth module 578 using a Universal Asynchronous Receiver Transmitter (UART) 588 running at 115.2 kbaud. Communications to the PMU 580 and the Force Sensor microprocessor (FSP) 582 are performed using a Low Speed Serial bus (LSS) 590. The LSS is implemented in software and uses two of the microprocessor's general purpose IOs.

The ARM7 microprocessor 574 is programmed via its JTAG port.

5.6.2 Image Sensor

The 'Jupiter' Image Sensor 584 (see US Publication No. 2005/0024510, the contents of which are incorporated herein by reference) contains a monochrome sensor array, an analogue to digital converter (ADC), a frame store buffer, a simple image processor and a phase lock loop (PLL). In the pen, Jupiter uses the USRT's clock line and its internal PLL to generate all its clocking requirements. Images captured by the sensor array are stored in the frame store buffer. These images are decoded by the ARM7 microprocessor 574 with help from the 'Callisto' image processor contained in Jupiter. The Callisto image processor performs, inter alia, low-pass filtering of captured images (see Section 4.11 and US Publication No. 2005/0024510) before macrodot sampling and decoding by the microprocessor 574.

Jupiter controls the strobing of two infrared LEDs 434 and 436 at the same time as its image array is exposed. One or other of these two infrared LEDs may be turned off while the image array is exposed to prevent specular reflection off the paper that can occur at certain angles.

5.6.3 Bluetooth Communications Module

The pen uses a CSR BlueCore4-External device (see CSR, BlueCore4-External Data Sheet rev c, 6 Sep. 2004) as the Bluetooth controller 578. It requires an external 8 Mbit flash memory device 594 to hold its program code. The BlueCore4 meets the Bluetooth v1.2 specification and is compliant to v0.9 of the Enhanced Data Rate (EDR) specification which allows communication at up to 3 Mbps.

A 2.45 GHz chip antenna 486 is used on the pen for the Bluetooth communications.

The BlueCore4 is capable of forming a UART to USB bridge. This is used to allow USB communications via data/power socket 458 at the top of the pen 456.

Alternatives to Bluetooth include wireless LAN and PAN standards such as IEEE 802.11 (Wi-Fi) (see IEEE, 802.11 Wireless Local Area Networks, http://grouper.ieee.org/groups/802/11/index.html), IEEE 802.15 (see IEEE, 802.15 Working Group for WPAN, http://grouper.ieee.org/groups/802/15/index.html), ZigBee (see ZigBee Alliance, http://www.zigbee.org), and WirelessUSB Cypress (see WirelessUSB LR 2.4-GHz DSSS Radio SoC, http://www.cypress.com/cfuploads/img/products/cywusb6935.pdf), as well as mobile standards such as GSM (see GSM Association, http://www.gsmworld.com/index.shtml), GPRS/EDGE, GPRS Platform, http://www.gsmworld.com/technology/gprs/index.shtml), CDMA (see CDMA Development Group, http://www.cdg.org/, and Qualcomm, http://www.qualcomm.com), and UMTS (see 3rd Generation Partnership Project (3GPP), http://www.3gpp.org).

5.6.4 Power Management Chip

The pen uses an Austria Microsystems AS3603 PMU 580 (see Austria Microsystems, AS3603 Multi-Standard Power Management Unit Data Sheet v2.0). The PMU is used for battery management, voltage generation, power up reset generation and driving indicator LEDs and the vibrator motor.

The PMU 580 communicates with the ARM7 microprocessor 574 via the LSS bus 590.

5.6.5 Force Sensor Subsystem

The force sensor subsystem comprises a custom Hokuriku force sensor 500 (based on Hokuriku, HFD-500 Force Sensor, http://www.hdk.cojp/pdf/eng/e1381AA.pdf), an amplifier and low pass filter 600 implemented using op-amps and a force sensor microprocessor 582.

The pen uses a Silicon Laboratories C8051F330 as the force sensor microprocessor 582 (see Silicon Laboratories, C8051F330/1 MCU Data Sheet, rev 1.1). The C8051F330 is an 8051 microprocessor with on chip flash memory, 10 bit ADC and 10 bit DAC. It contains an internal 24.5 MHz oscillator and also uses an external 32.768 kHz tuning fork.

The Hokuriku force sensor 500 is a silicon piezoresistive bridge sensor. An op-amp stage 600 amplifies and low pass (anti-alias) filters the force sensor output. This signal is then sampled by the force sensor microprocessor 582 at 5 kHz.

Alternatives to piezoresistive force sensing include capacitive and inductive force sensing (see Wacom, "Variable capacity condenser and pointer", US Patent Application 20010038384, filed 8 Nov. 2001, and Wacom, Technology, http://www.wacom-components.com/english/tech.asp).

The force sensor microprocessor 582 performs further (digital) filtering of the force signal and produces the force sensor values for the digital ink stream. A frame sync signal from the Jupiter image sensor 576 is used to trigger the generation of each force sample for the digital ink stream. The temperature is measured via the force sensor microprocessor's 582 on chip temperature sensor and this is used to compensate for the temperature dependence of the force sensor and amplifier. The offset of the force signal is dynamically controlled by input of the microprocessor's DAC output into the amplifier stage 600.

The force sensor microprocessor 582 communicates with the ARM7 microprocessor 574 via the LSS bus 590. There are two separate interrupt lines from the force sensor microprocessor 582 to the ARM7 microprocessor 574. One is used to indicate that a force sensor sample is ready for reading and the other to indicate that a pen down/up event has occurred.

The force sensor microprocessor flash memory is programmed in-circuit by the ARM7 microprocessor 574.

The force sensor microprocessor 582 also provides the real time clock functionality for the pen 400. The RTC function is performed in one of the microprocessor's counter timers and runs from the external 32.768 kHz tuning fork. As a result, the force sensor microprocessor needs to remain on when the cap 472 is on and the ARM7 574 is powered down. Hence the force sensor microprocessor 582 uses a low power LDO separate from the PMU 580 as its power source. The real time clock functionality includes an interrupt which can be programmed to power up the ARM7 574.

The cap switch 602 is monitored by the force sensor microprocessor 582. When the cap assembly 472 is taken off (or there is a real time clock interrupt), the force sensor microprocessor 582 starts up the ARM7 572 by initiating a power on and reset cycle in the PMU 580.

5.7 Pen Software

The Netpage pen software comprises that software running on microprocessors in the Netpage pen 400 and Netpage pod.

The pen contains a number of microprocessors, as detailed in Section 5.6. The Netpage pen software includes software running on the Atmel ARM7 CPU 574 (hereafter CPU), the Force Sensor microprocessor 582, and also software running in the VM on the CSR BlueCore Bluetooth module 578 (hereafter pen BlueCore). Each of these processors has an associated flash memory which stores the processor specific software, together with settings and other persistent data. The pen BlueCore 578 also runs firmware supplied by the module manufacturer, and this firmware is not considered a part of the Netpage pen software.

The pod contains a CSR BlueCore Bluetooth module (hereafter pod BlueCore). The Netpage pen software also includes software running in the VM on the pod BlueCore.

As the Netpage pen 400 traverses a Netpage tagged surface 548, a stream of correlated position and force samples are produced. This stream is referred to as DInk. Note that DInk may include samples with zero force (so called "Hover DInk") produced when the Netpage pen is in proximity to, but not marking, a Netpage tagged surface.

The CPU component of the Netpage pen software is responsible for DInk capture, tag image processing and decoding (in conjunction with the Jupiter image sensor 576), storage and offload management, host communications, user feedback and software upgrade. It includes an operating system (RTOS) and relevant hardware drivers. In addition, it provides a manufacturing and maintenance mode for calibration, configuration or detailed (non-field) fault diagnosis. The Force Sensor microprocessor 582 component of the Netpage pen software is responsible for filtering and preparing force samples for the main CPU. The pen BlueCore VM software is responsible for bridging the CPU UART 588 interface to USB when the pen is operating in tethered mode. The pen BlueCore VM software is not used when the pen is operating in Bluetooth mode.

The pod BlueCore VM software is responsible for sensing when the pod is charging a pen 400, controlling the pod LEDs appropriately, and communicating with the host PC via USB.

For a detailed description of the software modules, reference is made to US Publication No. 2006/0028459, the contents of which are herein incorporated by reference.

The present invention has been described with reference to a preferred embodiment and number of specific alternative embodiments. However, it will be appreciated by those skilled in the relevant fields that a number of other embodiments, differing from those specifically described, will also fall within the spirit and scope of the present invention. Accordingly, it will be understood that the invention is not intended to be limited to the specific embodiments described in the present specification, including documents incorporated by cross-reference as appropriate. The scope of the invention is only limited by the attached claims.

The invention claimed is:

1. A substrate having a first coding pattern disposed on a surface thereof, said first coding pattern comprising:
   a plurality of target elements defining a target grid, said target grid comprising a plurality of cells, wherein neighboring cells share target elements;
   a plurality of data elements contained in each cell; and
   a plurality of tags, each tag being defined by a first set of contiguous cells, each tag comprising respective tag data encoded by a respective set of said data elements, wherein each cell comprises one or more registration symbols encoded by a respective set of said data elements, one or more registration symbols identifying a number of cells contained in said first set so as to identify said first coding pattern and distinguish the first coding pattern from a second coding pattern.

2. The substrate of claim 1, wherein said first coding pattern and said second coding pattern are both readable and decodable by a same optical reader.

3. The substrate of claim 2, wherein said second coding pattern comprises:
   a plurality of target elements defining a target grid, said target grid comprising a plurality of cells, wherein neighboring cells share target elements;
   a plurality of data elements contained in each cell; and
   a plurality of tags, each tag being defined by a second set of contiguous cells, each tag comprising respective tag data encoded by a respective set of said data elements, wherein said second set contains a different number of cells than said first set.

4. The substrate of claim 3, wherein each cell of said first coding pattern and said second coding pattern comprises one or more registration symbols.

5. The substrate of claim 4, wherein said registration symbols in said first and second coding patterns are configured and positioned identically relative to target elements contained by each cell.

6. The substrate of claim 3, wherein said second coding pattern is printable at a lower print resolution than said first coding pattern.

7. The substrate of claim 6, wherein said second set contains a fewer number of cells than said first set.

8. The substrate of claim 1, wherein each registration symbol identifies a translation of said cell relative to a tag containing said cell.

9. The substrate of claim 8, wherein each cell comprises a pair of orthogonal registration symbols, each orthogonal registration symbol identifying a respective orthogonal translation of said cell relative to a tag containing said cell.

10. The substrate of claim 1, wherein each tag is square and comprises $M^2$ contiguous square cells, wherein M is an integer having a value of at least 2.

11. The substrate of claim 10, wherein M registration symbols in a row of M cells define a cyclic position code having minimum distance M, said code being defined by a first translation codeword.

12. The substrate of claim 11, wherein M registration symbols in a column of M cells define a cyclic position code having minimum distance M, said code being defined by a second translation codeword.

13. The substrate of claim 12, wherein said data elements are macrodots, and wherein a portion of data is represented by m macrodots, each of said macrodots occupying a respective position from a plurality of predetermined possible positions p within said cell, the respective positions of said macrodots representing one of a plurality of possible data values, wherein m is an integer of 2 or more, and $p \geq 2m$.

14. The substrate of claim 10, wherein each tag comprises N cells, and at least N registration symbols form a third translation codeword with minimum distance N, wherein N is an integer having a value of at least 4.

15. The substrate of claim 1, wherein each registration symbol identifies an orientation of a layout of said tag data with respect to said target grid.

16. The substrate of claim 1, wherein each cell defines a symbol group, each symbol group comprising a plurality of Reed-Solomon symbols encoded by a plurality of said data elements.

* * * * *